US012508182B2

(12) United States Patent
Wolters et al.

(10) Patent No.: US 12,508,182 B2
(45) Date of Patent: Dec. 30, 2025

(54) SHEET ASSEMBLY FOR POSITIONING A PATIENT

(71) Applicant: Sage Products, LLC, Cary, IL (US)

(72) Inventors: Noah Wolters, Cary, IL (US); Hester C. Fletcher, Louisa, VA (US); Daniel R. Ulreich, Cary, IL (US)

(73) Assignee: Sage Products, LLC, Cary, IL (US)

(*) Notice: Subject to any disclaimer, the term of this patent is extended or adjusted under 35 U.S.C. 154(b) by 0 days.

(21) Appl. No.: 18/641,867

(22) Filed: Apr. 22, 2024

(65) Prior Publication Data

US 2024/0358571 A1 Oct. 31, 2024

Related U.S. Application Data

(60) Provisional application No. 63/461,973, filed on Apr. 26, 2023.

(51) Int. Cl.
*A61G 7/10* (2006.01)

(52) U.S. Cl.
CPC .................................. *A61G 7/1026* (2013.01)

(58) Field of Classification Search
None
See application file for complete search history.

(56) References Cited

U.S. PATENT DOCUMENTS

| | | | |
|---|---|---|---|
| 542,720 | A | 7/1895 | Weiss |
| 674,451 | A | 5/1901 | Bunker |
| 1,334,901 | A | 3/1920 | Higdon |
| 1,726,939 | A | 9/1929 | Anderson |
| 2,068,134 | A | 1/1937 | Houghton |
| 2,573,375 | A | 10/1951 | Winstead |
| 2,582,439 | A | 1/1952 | Kavanagh |
| 2,750,606 | A | 6/1956 | Freedlander et al. |

(Continued)

FOREIGN PATENT DOCUMENTS

| | | | |
|---|---|---|---|
| AU | 2008256995 | A1 | 12/2008 |
| CN | 208259823 | U | 12/2018 |

(Continued)

OTHER PUBLICATIONS

Blaine Miller, Provisional Draft Declaration, U.S. Pat. No. 8,511,314, Reexamination Control No. 90/013,087, published Dec. 18, 2018, 11 pages.

(Continued)

*Primary Examiner* — Adam C Ortiz
(74) *Attorney, Agent, or Firm* — FOLEY & LARDNER LLP

(57) ABSTRACT

A sheet assembly for positioned a patient includes a base sheet a first handle interface, and a second handle interface. The base sheet defines a first axis extending in a direction parallel to a width of the base sheet and a second axis extending in a direction parallel to a length of the base sheet. The base sheet has a first end on a first side of the first axis and a second end on a second side of the first axis. The first handle interface is positioned on the first end of the base sheet. The first handle interface defines a first opening configured to receive a hand of an operator of the sheet assembly. The second handle interface is positioned on the second end of the base sheet. The second handle interface defines a second opening configured to receive the hand.

17 Claims, 21 Drawing Sheets

(56) References Cited

U.S. PATENT DOCUMENTS

| | | | |
|---|---|---|---|
| 2,804,911 | A | 9/1957 | Howarth |
| D195,020 | S | 4/1963 | Emery |
| 3,112,956 | A | 12/1963 | Shick et al. |
| 3,155,991 | A | 11/1964 | Dunham |
| 3,166,799 | A | 1/1965 | Milton |
| 3,178,732 | A | 4/1965 | Stibitz |
| 3,205,010 | A | 9/1965 | Schick |
| 3,325,832 | A | 6/1967 | Malicki |
| 3,333,286 | A | 8/1967 | Biolik |
| 3,452,372 | A | 7/1969 | Emery |
| 3,474,781 | A | 10/1969 | Gaylord, Jr. |
| 3,477,071 | A | 11/1969 | Emerson |
| 3,503,649 | A | 3/1970 | Johnson |
| 3,523,563 | A | 8/1970 | Mirando |
| 3,536,117 | A | 10/1970 | Huber |
| 3,653,083 | A | 4/1972 | Lapidus |
| 3,778,851 | A | 12/1973 | Howorth |
| 3,785,395 | A | 1/1974 | Andreasson |
| 3,829,914 | A | 8/1974 | Treat |
| 3,933,154 | A | 1/1976 | Cabansag |
| 3,965,503 | A | 6/1976 | Gridel |
| 4,030,719 | A | 6/1977 | Gabriele et al. |
| 4,048,681 | A | 9/1977 | Baulch et al. |
| 4,066,072 | A | 1/1978 | Cummins |
| 4,073,021 | A | 2/1978 | Carlisle |
| 4,108,170 | A | 8/1978 | Spann |
| 4,132,228 | A | 1/1979 | Green |
| 4,214,326 | A | 7/1980 | Spann |
| 4,233,700 | A | 11/1980 | Spann |
| 4,247,963 | A | 2/1981 | Reddi |
| 4,272,856 | A | 6/1981 | Wegener et al. |
| 4,370,769 | A | 2/1983 | Herzig et al. |
| 4,389,742 | A | 6/1983 | DeWitt |
| 4,391,010 | A | 7/1983 | Kronman |
| 4,417,710 | A | 11/1983 | Adair |
| 4,425,676 | A | 1/1984 | Crane |
| 4,509,214 | A | 4/1985 | Shea |
| 4,517,690 | A | 5/1985 | Wegener |
| 4,528,704 | A | 7/1985 | Wegener et al. |
| 4,554,693 | A | 11/1985 | Calloway |
| 4,627,426 | A | 12/1986 | Wegener et al. |
| 4,627,796 | A | 12/1986 | Moore |
| 4,662,016 | A | 5/1987 | Seeman |
| 4,662,366 | A | 5/1987 | Tari |
| 4,675,925 | A | 6/1987 | Littleton |
| 4,686,719 | A | 8/1987 | Johnson et al. |
| 4,694,515 | A | 9/1987 | Rogers, Jr. |
| 4,802,249 | A | 2/1989 | Bills |
| 4,809,484 | A | 3/1989 | Lovik |
| 4,823,417 | A | 4/1989 | Fukuichi |
| 4,858,625 | A | 8/1989 | Cramer |
| 4,867,230 | A | 9/1989 | Voss |
| 4,905,712 | A | 3/1990 | Bowlin et al. |
| 4,908,895 | A | 3/1990 | Walker |
| 4,912,861 | A | 4/1990 | Huang |
| 4,944,053 | A | 7/1990 | Smith |
| 4,977,629 | A | 12/1990 | Jones |
| 5,012,821 | A | 5/1991 | Tarver |
| 5,016,650 | A | 5/1991 | Marlar |
| 5,022,110 | A | 6/1991 | Stroh |
| 5,056,533 | A | 10/1991 | Solano |
| 5,060,324 | A | 10/1991 | Marinberg et al. |
| 5,067,189 | A | 11/1991 | Weedling et al. |
| 5,070,559 | A | 12/1991 | Pettifer |
| 5,086,543 | A | 2/1992 | Mitchell |
| 5,088,747 | A | 2/1992 | Morrison et al. |
| 5,111,838 | A | 5/1992 | Langston |
| 5,123,699 | A | 6/1992 | Warburton |
| 5,138,731 | A | 8/1992 | Harcrow, Jr. |
| 5,142,720 | A | 9/1992 | Kelso et al. |
| 5,144,708 | A | 9/1992 | Pekar |
| 5,148,563 | A | 9/1992 | Klearman et al. |
| D331,270 | S | 11/1992 | Johnson et al. |
| 5,168,589 | A | 12/1992 | Stroh et al. |
| 5,182,828 | A | 2/1993 | Alivizatos |
| 5,193,238 | A | 3/1993 | Clute |
| 5,199,121 | A | 4/1993 | Payne |
| 5,226,186 | A | 7/1993 | Boyd |
| 5,280,657 | A | 1/1994 | Stagg |
| 5,329,655 | A | 7/1994 | Garner |
| 5,331,698 | A | 7/1994 | Newkirk et al. |
| 5,362,302 | A | 11/1994 | Jensen et al. |
| 5,369,829 | A | 12/1994 | Jay |
| 5,373,595 | A | 12/1994 | Johnson et al. |
| 5,390,384 | A | 2/1995 | Dinsmoor et al. |
| 5,395,162 | A | 3/1995 | Jay et al. |
| 5,398,678 | A | 3/1995 | Gamow |
| 5,426,801 | A | 6/1995 | Klearman et al. |
| 5,438,721 | A | 8/1995 | Pahno et al. |
| 5,447,235 | A | 9/1995 | Pharo |
| 5,448,790 | A | 9/1995 | Saro et al. |
| 5,451,179 | A | 9/1995 | Laroi, Jr. et al. |
| 5,452,487 | A | 9/1995 | Leggett |
| 5,524,307 | A | 6/1996 | Griffin |
| RE35,299 | E | 7/1996 | Weedling et al. |
| 5,549,121 | A | 8/1996 | Vinci |
| 5,561,873 | A | 10/1996 | Weedling |
| 5,603,591 | A | 2/1997 | McLellan |
| RE35,468 | E | 3/1997 | Newman |
| 5,632,769 | A | 5/1997 | Kappel et al. |
| 5,634,224 | A | 6/1997 | Stephen |
| 5,671,977 | A | 9/1997 | Jay et al. |
| 5,702,153 | A | 12/1997 | Pliska |
| 5,742,958 | A | 4/1998 | Solazzo |
| 5,797,155 | A | 8/1998 | Maier et al. |
| 5,806,928 | A | 9/1998 | Gattuso et al. |
| 5,830,780 | A | 11/1998 | Dennison et al. |
| 5,836,027 | A | 11/1998 | Leventhal et al. |
| 5,836,654 | A | 11/1998 | DeBellis et al. |
| 5,957,491 | A | 9/1999 | Cech et al. |
| 6,012,183 | A | 1/2000 | Brooke et al. |
| 6,073,291 | A | 6/2000 | Davis |
| 6,082,824 | A | 7/2000 | Chow |
| 6,102,936 | A | 8/2000 | Augustine et al. |
| 6,108,861 | A | 8/2000 | Vystrcil et al. |
| 6,115,861 | A | 9/2000 | Reeder et al. |
| 6,145,143 | A | 11/2000 | Hicks et al. |
| 6,154,900 | A | 12/2000 | Shaw |
| 6,159,172 | A | 12/2000 | Gray et al. |
| 6,223,368 | B1 | 5/2001 | Anslin |
| 6,223,369 | B1 | 5/2001 | Maier et al. |
| 6,240,584 | B1 | 6/2001 | Perez et al. |
| 6,241,320 | B1 | 6/2001 | Chew et al. |
| 6,241,755 | B1 | 6/2001 | Arnold et al. |
| 6,273,810 | B1 | 8/2001 | Rhodes et al. |
| 6,317,909 | B1 | 11/2001 | Blum |
| 6,327,724 | B1 | 12/2001 | Sharrock et al. |
| 6,347,642 | B1 | 2/2002 | Schulte |
| 6,357,084 | B1 | 3/2002 | Haidon |
| 6,367,106 | B1 | 4/2002 | Gronsman |
| 6,374,435 | B1 | 4/2002 | Leininger et al. |
| 6,413,194 | B1 | 7/2002 | Gant |
| 6,427,268 | B1 | 8/2002 | Davis |
| 6,467,106 | B1 | 10/2002 | Heimbrock |
| 6,484,334 | B1 | 11/2002 | Borders et al. |
| 6,510,574 | B2 | 1/2003 | Sharrock et al. |
| 6,541,094 | B1 | 4/2003 | Landvik et al. |
| 6,543,068 | B1 | 4/2003 | Penninger |
| 6,560,793 | B2 | 5/2003 | Walker |
| 6,653,363 | B1 | 11/2003 | Tursi et al. |
| 6,658,676 | B1 | 12/2003 | Persson et al. |
| 6,666,426 | B1 | 12/2003 | Taylor |
| 6,698,041 | B2 | 3/2004 | VanSteenburg et al. |
| 6,701,544 | B2 | 3/2004 | Heimbrock |
| 6,701,558 | B2 | 3/2004 | VanSteenburg |
| 6,701,559 | B2 | 3/2004 | Boso et al. |
| 6,804,845 | B2 | 10/2004 | Stewart et al. |
| 6,820,292 | B2 | 11/2004 | Heimbrock |
| 6,874,176 | B2 | 4/2005 | Berge |
| 6,898,809 | B2 | 5/2005 | Davis |
| D508,182 | S | 8/2005 | Colonello |
| 6,964,073 | B1 | 11/2005 | Curry |
| 6,966,275 | B2 | 11/2005 | Whitehill |
| 7,028,350 | B1 | 4/2006 | Davis |

(56) References Cited

U.S. PATENT DOCUMENTS 7,032,261 B2 4/2006 Heimbrock
7,040,706 B2 5/2006 Koffler
7,074,166 B2 7/2006 Weitzman
7,107,641 B2 9/2006 Davis
7,114,204 B2 10/2006 Patrick
7,131,154 B2 11/2006 Davis et al.
7,168,115 B2 1/2007 Davis
7,210,176 B2 5/2007 Weedling et al.
7,225,486 B2 6/2007 Jackson
7,240,384 B2 7/2007 DuDonis
7,243,382 B2 7/2007 Weedling et al.
7,266,852 B2 9/2007 Davis
7,337,485 B2 3/2008 Metzger
7,340,785 B2 3/2008 Weedling et al.
7,373,680 B2 5/2008 Davis
7,376,995 B2 5/2008 Davis
7,406,723 B2 8/2008 Davis
7,415,738 B2 8/2008 Weedling et al.
7,467,431 B2 12/2008 Weedling et al.
7,506,387 B1 3/2009 Scordato et al.
7,565,709 B2 7/2009 Davis
7,571,498 B2 8/2009 Jewell et al.
7,574,761 B2 8/2009 Davis
7,591,029 B2 9/2009 Weedling et al.
7,627,910 B2 12/2009 Davis
7,650,654 B2 1/2010 Lambarth et al.
7,676,862 B2 3/2010 Poulos et al.
7,681,262 B2 3/2010 Weedling et al.
7,712,170 B2 5/2010 Davis
7,731,282 B2 6/2010 Leeds
7,731,283 B2 6/2010 Leeds
7,735,164 B1 6/2010 Patrick
7,739,758 B2 6/2010 Weedling et al.
7,757,318 B2 7/2010 Poulos et al.
7,784,132 B2 8/2010 Gonzalez et al.
7,810,193 B1 10/2010 Ennis et al.
7,900,299 B2 3/2011 Weedling et al.
7,914,081 B1 3/2011 Smith
7,914,611 B2 3/2011 Vrzalik et al.
7,954,187 B1 6/2011 Earnest
8,001,635 B2 8/2011 Humbles
8,118,920 B2 2/2012 Vrzalik
8,127,382 B1 3/2012 Plascencia et al.
8,128,065 B2 3/2012 King et al.
8,161,583 B1 4/2012 Palen
8,214,951 B1 7/2012 Batta
8,234,727 B2 8/2012 Schreiber et al.
8,276,222 B1 10/2012 Patrick
8,302,222 B2 11/2012 Jasani
8,353,069 B1 1/2013 Miller
8,372,182 B2 2/2013 Vrzalik et al.
8,387,177 B2 3/2013 Davis
8,413,277 B2 4/2013 Davis et al.
8,464,376 B1 6/2013 Waite
8,464,720 B1 6/2013 Pigazzi et al.
8,511,314 B2 8/2013 Pigazzi et al.
8,539,621 B2 9/2013 West
8,539,622 B2 9/2013 West
8,539,623 B2 9/2013 West
8,566,977 B2 10/2013 Davis
8,590,574 B2 11/2013 Jian et al.
8,601,623 B1 12/2013 West
8,602,032 B2 12/2013 Goldsmith
8,661,580 B2 3/2014 Giap
8,678,418 B1 3/2014 Quarles
8,782,830 B2 7/2014 Brykalski et al.
8,789,533 B2 7/2014 Steffens et al.
D712,555 S 9/2014 Berg
8,850,634 B2 10/2014 Ponsi et al.
8,918,930 B2 12/2014 Stroh et al.
8,978,184 B1 3/2015 Garrett
9,132,052 B2 9/2015 Fowler et al.
9,161,876 B2 10/2015 Pigazzi et al.
9,254,231 B2 2/2016 Vrzalik et al.
9,271,588 B1 3/2016 Phillips et al.
9,308,122 B2 4/2016 Dunlop
9,321,392 B1 4/2016 Lebrun
9,326,903 B2 5/2016 Locke
9,332,850 B2 5/2016 Krishtul
9,375,343 B2 6/2016 Marshall et al.
9,522,078 B2 12/2016 Pizzini
9,538,853 B2 1/2017 Vrzalik et al.
9,554,956 B2 1/2017 Reiners et al.
D781,615 S 3/2017 Parman
9,675,509 B2 6/2017 Tilk et al.
9,693,919 B2 7/2017 Berman
9,693,920 B2 7/2017 Fowler et al.
9,750,656 B1 9/2017 Pigazzi et al.
9,782,287 B2 10/2017 Pigazzi et al.
9,782,312 B2 10/2017 Brubaker et al.
9,782,313 B2 10/2017 Hindson
9,795,529 B2 10/2017 Lehtio
9,835,344 B2 12/2017 Vrzalik et al.
9,849,053 B2 12/2017 Rigoni et al.
9,907,408 B2 3/2018 Vrzalik et al.
9,931,262 B2 4/2018 Pigazzi et al.
9,949,883 B1 4/2018 Pigazzi et al.
9,962,122 B2 5/2018 Augustine et al.
9,968,500 B1 5/2018 Amini et al.
10,016,066 B2 7/2018 Howard
10,034,808 B2 7/2018 Vrzalik et al.
10,039,680 B2 8/2018 Galbraith
10,045,902 B1 8/2018 Pigazzi et al.
10,064,770 B2 9/2018 Reiners et al.
10,092,470 B2 10/2018 Lewis
10,098,800 B2 10/2018 Pigazzi et al.
10,112,513 B2 10/2018 Patrick et al.
10,159,533 B2 12/2018 Moll et al.
10,172,470 B1 1/2019 Vrzalik et al.
10,206,830 B2 2/2019 Fowler et al.
10,285,888 B2 5/2019 Liu
10,285,890 B1 5/2019 Pigazzi et al.
10,314,417 B2 6/2019 Duck
10,322,050 B1 6/2019 Pigazzi et al.
10,363,185 B2 7/2019 Purdy et al.
10,363,188 B2 7/2019 Young
10,376,430 B2 8/2019 Liu
10,398,614 B2 9/2019 Rigoni et al.
10,500,115 B2 12/2019 Weedling
10,512,578 B2 12/2019 Visco
10,561,522 B2 2/2020 Giap
10,568,435 B2 2/2020 Luckemeyer et al.
10,576,004 B1 3/2020 Frances
10,588,800 B2 3/2020 Fletcher et al.
10,709,626 B1 7/2020 Gomez
10,716,724 B2 7/2020 Vrzalik et al.
10,765,576 B2 9/2020 Rigoni et al.
10,765,580 B1 9/2020 Augustine
10,772,778 B2 9/2020 Hahn et al.
10,828,216 B2 11/2020 Phalen et al.
10,912,699 B2 2/2021 Pigazzi et al.
10,993,866 B2 5/2021 Augustine
11,020,301 B2 6/2021 Messerschmidt
11,224,548 B2 1/2022 Depauw
11,224,550 B1 1/2022 Gomez
11,266,525 B2 3/2022 Kaforey et al.
11,298,282 B2 4/2022 Davis et al.
11,324,650 B2 5/2022 Zhou et al.
11,364,166 B2 6/2022 Grindstaff et al.
11,439,551 B2 9/2022 Davis et al.
11,471,317 B1 10/2022 Spears
11,484,431 B2 11/2022 Allen
11,484,456 B2 11/2022 Pigazzi et al.
11,510,836 B2 11/2022 Cole et al.
11,607,358 B2 3/2023 Spahn et al.
11,638,670 B1 5/2023 Volz et al.
11,642,267 B2 5/2023 Kea et al.
11,654,068 B2 5/2023 Giap
11,661,129 B2 5/2023 Chambers et al.
11,701,281 B2 7/2023 Meah
11,737,939 B2 8/2023 Davis et al.
11,833,091 B2 12/2023 Vrzalik et al.
11,890,240 B2 2/2024 Ponsi et al.
2001/0013146 A1 8/2001 Wempe

(56) References Cited

U.S. PATENT DOCUMENTS

| | | | | |
|---|---|---|---|---|
| 2001/0040402 | A1 | 11/2001 | Odderson | |
| 2002/0029417 | A1 | 3/2002 | Walker | |
| 2002/0108179 | A1 | 8/2002 | Kiser | |
| 2002/0109381 | A1 | 8/2002 | Duncan | |
| 2002/0112286 | A1 | 8/2002 | Upton et al. | |
| 2002/0133877 | A1 | 9/2002 | Kuiper et al. | |
| 2002/0148045 | A1 | 10/2002 | Giori et al. | |
| 2002/0148474 | A1 | 10/2002 | Larson | |
| 2003/0009952 | A1 | 1/2003 | Gallant et al. | |
| 2003/0014821 | A1 | 1/2003 | Boyd | |
| 2003/0030319 | A1 | 2/2003 | Clapper | |
| 2003/0041379 | A1 | 3/2003 | Habboub et al. | |
| 2003/0061663 | A1 | 4/2003 | Lampel | |
| 2003/0066134 | A1 | 4/2003 | Chapman | |
| 2003/0159212 | A1 | 8/2003 | Patrick et al. | |
| 2003/0205920 | A1 | 11/2003 | Sprouse et al. | |
| 2004/0083550 | A1 | 5/2004 | Graebe, Jr. | |
| 2004/0123382 | A1 | 7/2004 | Berge | |
| 2004/0237203 | A1 | 12/2004 | Romano et al. | |
| 2005/0005358 | A1 | 1/2005 | DuDonis | |
| 2005/0028273 | A1 | 2/2005 | Weedling et al. | |
| 2005/0034242 | A1 | 2/2005 | Davis | |
| 2005/0055768 | A1 | 3/2005 | Assink | |
| 2005/0076437 | A1 | 4/2005 | Johnson | |
| 2005/0091749 | A1 | 5/2005 | Humbles | |
| 2005/0102750 | A1 | 5/2005 | Berge | |
| 2005/0151410 | A1 | 7/2005 | Sprouse, II | |
| 2005/0210595 | A1 | 9/2005 | Di Stasio et al. | |
| 2005/0229314 | A1 | 10/2005 | Chisari | |
| 2005/0235423 | A1 | 10/2005 | Hetzel et al. | |
| 2006/0000016 | A1 | 1/2006 | Weedling et al. | |
| 2006/0072347 | A1 | 4/2006 | Ferraro | |
| 2006/0162086 | A1 | 7/2006 | Davis | |
| 2006/0213010 | A1 | 9/2006 | Davis | |
| 2007/0006388 | A1 | 1/2007 | Townsend | |
| 2007/0072690 | A1 | 3/2007 | Berenson et al. | |
| 2007/0074760 | A1 | 4/2007 | Wu | |
| 2007/0118993 | A1 | 5/2007 | Bates | |
| 2007/0266494 | A1 | 11/2007 | DeLuca et al. | |
| 2007/0283498 | A1 | 12/2007 | Shelby | |
| 2008/0022461 | A1 | 1/2008 | Bartlett et al. | |
| 2008/0028516 | A1 | 2/2008 | Morishima | |
| 2008/0029940 | A1 | 2/2008 | Kammer et al. | |
| 2008/0078033 | A1 | 4/2008 | Wyatt et al. | |
| 2008/0209630 | A1 | 9/2008 | Kazala et al. | |
| 2008/0216231 | A1 | 9/2008 | Lambarth et al. | |
| 2008/0289102 | A1 | 11/2008 | Davis | |
| 2009/0000037 | A1 | 1/2009 | Graebe, Jr. | |
| 2009/0211168 | A1 | 8/2009 | Bogar | |
| 2009/0265857 | A1 | 10/2009 | Habegger | |
| 2009/0295203 | A1 | 12/2009 | Lewis et al. | |
| 2010/0257703 | A1 | 10/2010 | Vass | |
| 2010/0290931 | A1 | 11/2010 | Sanders et al. | |
| 2011/0035880 | A1 | 2/2011 | Cole et al. | |
| 2011/0056017 | A1 | 3/2011 | Schreiber et al. | |
| 2011/0068939 | A1 | 3/2011 | Lachenbruch | |
| 2011/0072579 | A1 | 3/2011 | Receveur et al. | |
| 2011/0219546 | A1 | 9/2011 | West | |
| 2011/0247725 | A1 | 10/2011 | Frayne et al. | |
| 2011/0271444 | A1 | 11/2011 | Davis | |
| 2011/0277234 | A1 | 11/2011 | Jasani | |
| 2011/0296609 | A1 | 12/2011 | Giap | |
| 2011/0304186 | A1 | 12/2011 | Andrews | |
| 2012/0009844 | A1 | 1/2012 | Waters et al. | |
| 2012/0073053 | A1 | 3/2012 | Turner et al. | |
| 2012/0085430 | A1 | 4/2012 | Johansson et al. | |
| 2012/0124752 | A1 | 5/2012 | Patrick | |
| 2012/0131746 | A1 | 5/2012 | Griffin et al. | |
| 2012/0144594 | A1 | 6/2012 | Nash | |
| 2012/0186012 | A1 | 7/2012 | Ponsi et al. | |
| 2012/0186013 | A1 | 7/2012 | Ponsi | |
| 2012/0186587 | A1 | 7/2012 | Steffens et al. | |
| 2012/0210511 | A1 | 8/2012 | Davis | |
| 2012/0245500 | A1 | 9/2012 | Polliack et al. | |
| 2012/0255124 | A1 | 10/2012 | West | |
| 2012/0292958 | A1 | 11/2012 | Sprouse, II | |
| 2012/0304384 | A1 | 12/2012 | Scholz et al. | |
| 2012/0311783 | A1 | 12/2012 | Chiang et al. | |
| 2013/0019882 | A1 | 1/2013 | Durham et al. | |
| 2013/0042409 | A1 | 2/2013 | Gil Gomez et al. | |
| 2013/0042414 | A1 | 2/2013 | Schreiber et al. | |
| 2013/0104907 | A1 | 5/2013 | Giap | |
| 2013/0145549 | A1 | 6/2013 | Piegdon et al. | |
| 2013/0152950 | A1 | 6/2013 | Giap | |
| 2013/0205495 | A1 | 8/2013 | Ponsi et al. | |
| 2013/0263377 | A1 | 10/2013 | Wootten | |
| 2013/0269111 | A1 | 10/2013 | Berg | |
| 2013/0270881 | A1 | 10/2013 | Fowler et al. | |
| 2013/0318723 | A1 | 12/2013 | Li | |
| 2013/0320746 | A1 | 12/2013 | Amirault et al. | |
| 2013/0340772 | A1 | 12/2013 | Carlson et al. | |
| 2014/0007351 | A1 | 1/2014 | Cohen | |
| 2014/0082836 | A1 | 3/2014 | Patrick et al. | |
| 2014/0250601 | A1 | 9/2014 | Gomez | |
| 2014/0277307 | A1 | 9/2014 | Gammons et al. | |
| 2014/0283305 | A1 | 9/2014 | Zysman | |
| 2014/0304918 | A1 | 10/2014 | Steffens et al. | |
| 2014/0338121 | A1 | 11/2014 | Giap | |
| 2014/0352072 | A1 | 12/2014 | Holladay | |
| 2015/0040326 | A1 | 2/2015 | Fairburn et al. | |
| 2015/0113735 | A1 | 4/2015 | Anderson et al. | |
| 2015/0122266 | A1 | 5/2015 | Saunders et al. | |
| 2015/0189996 | A1 | 7/2015 | Scarlett et al. | |
| 2015/0224217 | A1 | 8/2015 | Rogers | |
| 2015/0225097 | A1 | 8/2015 | Anastasia | |
| 2015/0238378 | A1 | 8/2015 | Bhat et al. | |
| 2015/0289817 | A1 | 10/2015 | Augustine et al. | |
| 2015/0290027 | A1 | 10/2015 | Augustine et al. | |
| 2015/0290062 | A1 | 10/2015 | Augustine et al. | |
| 2015/0335165 | A1 | 11/2015 | Creekmuir et al. | |
| 2015/0369384 | A1 | 12/2015 | Frayne | |
| 2016/0095777 | A1 | 4/2016 | Berman | |
| 2016/0228281 | A1 | 8/2016 | Marshall et al. | |
| 2016/0245439 | A1 | 8/2016 | Fry | |
| 2016/0279007 | A1 | 9/2016 | Flatt | |
| 2017/0049646 | A1 | 2/2017 | Rigoni et al. | |
| 2017/0049647 | A1 | 2/2017 | Rigoni et al. | |
| 2017/0112655 | A1 | 4/2017 | Giap | |
| 2017/0119608 | A1 | 5/2017 | Rigoni et al. | |
| 2017/0216117 | A1 | 8/2017 | Rigoni et al. | |
| 2017/0231410 | A1 | 8/2017 | Chon et al. | |
| 2017/0239118 | A1 | 8/2017 | Cole et al. | |
| 2017/0326011 | A1 | 11/2017 | Alvarez et al. | |
| 2018/0017177 | A1 | 1/2018 | Marson et al. | |
| 2018/0140457 | A1 | 5/2018 | Sarma | |
| 2018/0192960 | A1 | 7/2018 | Augustine et al. | |
| 2018/0200130 | A1 | 7/2018 | Liu | |
| 2018/0221229 | A1 | 8/2018 | Kaiser et al. | |
| 2018/0221242 | A1 | 8/2018 | Lee et al. | |
| 2018/0289174 | A1 | 10/2018 | Ye et al. | |
| 2018/0303690 | A1 | 10/2018 | Hahn et al. | |
| 2018/0311097 | A1 | 11/2018 | Rodzewicz et al. | |
| 2018/0353360 | A1 | 12/2018 | Kea et al. | |
| 2018/0369050 | A1 | 12/2018 | Davis et al. | |
| 2019/0046382 | A1 | 2/2019 | Fiset et al. | |
| 2019/0049027 | A1 | 2/2019 | Bais | |
| 2019/0059603 | A1 | 2/2019 | Griffith et al. | |
| 2019/0083341 | A1 | 3/2019 | Ulreich et al. | |
| 2019/0091084 | A1 * | 3/2019 | Messerschmidt .... | A61G 7/1026 |
| 2019/0104996 | A1 | 4/2019 | Augustine et al. | |
| 2019/0151177 | A1 | 5/2019 | Giap | |
| 2019/0159843 | A1 | 5/2019 | Demri et al. | |
| 2019/0358102 | A1 | 11/2019 | Ueda | |
| 2019/0365586 | A1 * | 12/2019 | Latiff .................. | A61G 7/1013 |
| 2020/0008976 | A1 | 1/2020 | Molloy et al. | |
| 2020/0060912 | A1 | 2/2020 | Hollabaugh et al. | |
| 2020/0100606 | A1 | 4/2020 | Ganji | |
| 2021/0093498 | A1 | 4/2021 | Lafleche et al. | |
| 2021/0275371 | A1 | 9/2021 | Fowler et al. | |
| 2021/0401076 | A1 | 12/2021 | Jenkins et al. | |
| 2022/0000692 | A1 | 1/2022 | Gomez | |
| 2022/0023121 | A1 | 1/2022 | Davis | |
| 2022/0096304 | A1 | 3/2022 | Kaiser et al. | |
| 2022/0323283 | A1 | 10/2022 | Boulos et al. | |

(56) References Cited

U.S. PATENT DOCUMENTS

| | | | |
|---|---|---|---|
| 2023/0011458 A1 | 1/2023 | Parikh et al. | |
| 2023/0064553 A1 | 3/2023 | Fogel et al. | |
| 2024/0156661 A1 | 5/2024 | Kaforey | |
| 2024/0156662 A1 | 5/2024 | Kaforey et al. | |

FOREIGN PATENT DOCUMENTS

| | | | | |
|---|---|---|---|---|
| CN | 211326149 U | 8/2020 | | |
| DE | 10 2010 007 457 | 8/2011 | | |
| EP | 3 162 347 A1 | 5/2017 | | |
| EP | 3705100 A1 * | 9/2020 | | A61G 7/1026 |
| EP | 3705100 B1 * | 1/2022 | | A61G 1/048 |
| FR | 2923367 A1 | 5/2009 | | |
| GB | 2 300 845 A | 11/1996 | | |
| GB | 2 402 075 A | 12/2004 | | |
| GB | 2 415 912 | 1/2006 | | |
| JP | H10-117907 A | 5/1998 | | |
| SE | 527345 C2 | 2/2006 | | |
| WO | WO-88/10082 A1 | 12/1988 | | |
| WO | WO-96/27357 A1 | 9/1996 | | |
| WO | WO-02/065877 A1 | 8/2002 | | |
| WO | WO-2004/050002 A1 | 6/2004 | | |
| WO | WO-2005/007673 | 1/2005 | | |
| WO | WO-2005/086664 A2 | 9/2005 | | |
| WO | WO-2005/107673 A1 | 11/2005 | | |
| WO | WO-2012/001423 | 1/2012 | | |
| WO | WO-2012/170934 A2 | 12/2012 | | |
| WO | WO-2015/081233 A1 | 6/2015 | | |
| WO | WO-2015/081271 A2 | 6/2015 | | |
| WO | WO-2017/185039 A2 | 10/2017 | | |
| WO | WO-2017/197326 A1 | 11/2017 | | |
| WO | WO-2019/060424 A1 | 3/2019 | | |
| WO | WO-2019/152624 A1 | 8/2019 | | |
| WO | WO-2020/041493 A1 | 2/2020 | | |
| WO | WO-2020/136796 A1 | 7/2020 | | |

OTHER PUBLICATIONS

Craig Kaforey, Declaration, U.S. Pat. No. 8,511,314, Reexamination Control No. 90/013,087, published Sep. 10, 2014, 13 pages.
Craig Kaforey, Declaration, U.S. Pat. Nos. 8,511,314 and 8,464,720, Reexamination Control Nos. 90/013,088 and 90/013,088, published Apr. 18, 2014, 3 pages.
Craig Kaforey, Declaration, U.S. Pat. Nos. 8,511,314 and 8,464,720, Reexamination Control Nos. 90/013,088 and 90/013,088, published Sep. 10, 2014, 6 pages.
Dr. Alessio Pigazzi, Declaration, U.S. Pat. Nos. 8,511,314 and 8,464,720, Reexamination Control Nos. 90/013,088 and 90/013,088, published Sep. 10, 2014, 30 pages.
Dr. Gustavo Plasencia, Declaration, U.S. Pat. Nos. 8,511,314 and 8,464,720, Reexamination Control Nos. 90/013,088 and 90/013,088, published Sep. 10, 2014, 28 pages.
Dr. Maheswari Senthil, Declaration, U.S. Pat. No. 8,511,314, Reexamination Control No. 90/013,087, published Apr. 18, 2014, 18 pages.
Dr. Thomas Ljungman, Declaration, U.S. Pat. Nos. 8,511,314 and 8,464,720, Reexamination Control Nos. 90/013,088 and 90/013,088, published Sep. 10, 2014, 9 pages.
Glenn E. Beltz, Affidavit, U.S. Pat. Nos. 8,511,314 and 8,464,720, Reexamination Control Nos. 90/013,088 and 90/013,088, published Sep. 10, 2014, 19 pages.
Gustavo Plasencia, Declaration, U.S. Pat. No. 8,511,314, Reexamination Control No. 90/013,087, published Apr. 18, 2014, 29 pages.
International Search Report and Written Opinion for International Application No. PCT/US2022/018215, mailed Aug. 9, 2022, 18 pages.
Invitation to Pay Additional Fees for International Application No. PCT/US2022/018215, mailed Jun. 15, 2022, 12 pages.
Jennifer Klauschie et al., "Use of Anti-Skid Material and Patient-Positioning to Prevent Patient Shifting during Robotic-Assisted Gynecologic Procedures," J. Minim Invasive Gynecol., 2010; 17(4):504-507.
Michael Madigan, Affidavit, U.S. Pat. Nos. 8,511,314 and 8,464,720, Reexamination Control Nos. 90/013,088 and 90/013,088, published Sep. 10, 2014, 32 pages.
Paul Lloyd, Declaration, U.S. Pat. Nos. 8,511,314 and 8,464,720, Reexamination Control Nos. 90/013,088 and 90/013,088, published Sep. 10, 2014, 4 pages.
Record of Oral Hearing held Dec. 14, 2015, Appeal No. 2015-007832, Reexamination Control No. 90/013,088, mailed Jan. 4, 2016.
Soule Medical, Patient Positioning Systems Product Catalog, published Jan. 1, 2015, 63 pages.
"Boost" Definition in the Cambridge English Dictionary, Non-Final Office Action mailed on May 11, 2021, for U.S. Appl. No. 16/547,343.
"How to Set Up Kool Kat", Aug. 11, 2013, SKY High Amusements, Minutes 1:55-2:30, http://www.youtube.com/watch?v=a966cR6v6sc (Year: 2013).
Dec. 4, 2012—(WO) International Search Report and Written Opinion—App PCT/US2012/041729, 15 pages.
Dec. 10, 2013—International Preliminary Report on Patentability—App PCT/US2012/041729, 8 pages.
Dec. 31, 2013—U.S. Final Office Action—U.S. Appl. No. 13/014,497.
Jul. 12, 2013—(WO) International Search Report and Written Opinion—App PCT/US2013/036448, 9 pages.
Jul. 2, 2013—U.S. Non-Final Office Action—U.S. Appl. No. 13/014,497.
Mar. 20, 2013—U.S. Non-Final Office Action—U.S. Appl. No. 13/014,500.
Mar. 28, 2014—U.S. Non-Final Office Action—U.S. Appl. No. 13/156,103.
May 15, 2014—(WO) International Search Report and Written Opinion—App PCT/US12/22572, 25 pages.
Nov. 28, 2014—(EP) Search Report—App 14159820.1.
Oct. 14, 2014—(WO)International Preliminary Report on Patentability—App PCT Application No. PCT/US2013/036448, 6 pages.
Jun. 25, 2015—(EP) Extended Search Report—App 12739957.4.
May 15, 2015—(WO) International Search Report and Written Opinion—App PCT/US2014/067672.
Sep. 14, 2015—U.S. Non-Final Office Action—U.S. Appl. No. 13/838,952.
Mar. 14, 2016—(EP) Office Action—App 12739957.4.
Church et al., "Burn Wound Infections", Clinical Microbiology Reviews, 2006, vol. 19, No. 2, pp. 403-343.
Coleman Quick Pump Fitting Replacement Nozzle Main Adapter and Pinch Valve Tip, Sep. 6, 2014, Amazon.com, https://www.amazon.com/Coleman-Fitting-Replacement-Nozzle-Adapter/dp/B00JHRJ03A/ref=cm_cr_arp_d_product_top?ie=UTF8.
Communication pursuant to Article 94(3) EPC for EP Application No. 12728152.5 date Apr. 22, 2015, 5 pages.
Communication Pursuant to Article 94(3) EPC, dated Sep. 1, 2017.
Examination Report No. 1 for AU App. No. 2019325331, issued Jul. 11, 2024, 3 pages.
Examination Report No. 1 for AU Application No. 2018285855, mailed Mar. 16, 2023, 3 pages.
Examination Report No. 1 for Australian Application No. 2017252576 dated Feb. 14, 2019, 5 pages.
Examination Report No. 1 on AU 2021209239 Dtd Apr. 2, 2022 (4 pages).
Examination Report No. 3 for AU Application No. 2021209239, mailed Feb. 20, 2023, 7 pages.
Examination Report No. 4 for AU Application No. 2021209239, mailed Mar. 24, 2023, 3 pages.
Extended European Search Report for EP Application No. 19151698.8, dated Apr. 17, 2019, 6 pages.
HoverTech International, HoverMatt PROS (Patent Repositioning Off-Loading System), (2024), URL: https://hovermatt.com/products/hovermatt-pros-patient-repositioning-off-loading-system/.
HoverTech International, HoverMatt PROS Air on Vimeo, Feb. 23, 2024, URL: https://vimeo.com/916140683.
HoverTech International, HoverMatt PROS Animation on Vimeo, Mar. 2024, URL: https://vimeo.com/920124419.
HoverTech International, HoverMatt PROS on Vimeo, Feb. 23, 2024, URL: https://vimeo.com/916142851.

(56) References Cited

OTHER PUBLICATIONS

Hovertech, HoverMatt PROS, User Manual Rev C 11724, Mar. 2024, URL: https://hovermatt.com/wp-content/uploads/2024/03/Hov_PROSManual-RevC-11724.pdf.
Immedia OneWayGlide Rehab Assist, Jun. 15, 2004 http://www.rehabassist.com.au/immedia.htm.
International Preliminary Report on Patentability for International Application No. PCT/US2017/028954, issued Oct. 23, 2018, 9 pages.
International Preliminary Report on Patentability for International Application No. PCT/US2022/018215, mailed Oct. 19, 2023, 10 pages.
International Preliminary Report on Patentability for PCT Application No. PCT/US2014/067672 dated May 31, 2016, 12 pages.
International Search Report and Written Opinion for International Application No. PCT/US2017/028954, mailed Nov. 24, 2017, 16 pages.
International Search Report and Written Opinion for International Application No. PCT/US2018/037372, mailed Sep. 13, 2018, 13 pages.
International Search Report and Written Opinion for International Application No. PCT/US2019/047540, mailed Nov. 14, 2019, 13 pages.
OneWayGlide Instruction for Use, Immedia, Version 6, 2016, p. 7.
Photos of Stryker Glide holding strap, date unknown, two pages.
Prism Medical Company, 5300 Ergoglide Instructions, 2009, 2 pp. Maryland Heights, MO.
Romedic OneWaySlide, Handicare, Dec. 6, 2010.
Stryker Operations/Maintenance Manual for Stryker Glide Lateral Air Transfer System, Model 3062, date unknown, 33 pages.
Textbook of Palliative Nursing, Nov. 10, 2005, Oxford University Press, XP002740850, 1 page.
Waverley Glen, One-Way Glide—The Grimstead Range of Transfer and Repositioning Aids, Ontario Canada, downloaded Jun. 11, 2012, 3 pages.

* cited by examiner

SHEET ASSEMBLY FOR POSITIONING A PATIENT

CROSS-REFERENCE TO RELATED PATENT APPLICATION

This application claims the benefit of and priority to U.S. Provisional Patent Application No. 63/461,973, filed Apr. 26, 2023, which is incorporated herein by reference in its entirety.

BACKGROUND

Caregivers may move or reposition patients positioned on a bed to place the patients in a preferred orientation based on procedures being performed by the clinician. Further, the caregivers may utilize draw sheets to move or reposition a patient. The draw sheets may be placed under the patients back and the clinicians may lift and/or manipulate the draw sheets to move or reposition the patient. However, a draw sheet may be difficult for the caregivers to grasp. For example, when a caregiver grasps the fabric of the draw sheet, the hands of the clinician may slip when exerting the forces on the draw sheet needed to lift and/or manipulate the draw sheets to move or reposition the patient. This may result in accidents where the caregiver inadvertently releases the draw sheet when moving the patient, which can lead to patient injury and wasted time.

SUMMARY

In one embodiment, a sheet assembly for positioning a patient includes a base sheet, a first handle interface, and a second handle interface. The base sheet defines a first axis extending in a direction parallel to a width of the sheet and a second axis extending in a direction parallel to a length of the base sheet. The base sheet has a first end on a first side of the first axis and a second end on a second side of the first axis. The first handle interface is positioned on the first end of the base sheet. The first handle interface defines a first opening configured to receive a hand of an operator of the sheet assembly. The second handle interface is positioned on the second end of the base sheet. The second handle interface defines a second opening configured to receive the hand.

In another embodiment, a sheet assembly for positioning a patient includes a base sheet and a handle interface. The base sheet defines a first axis extending in a direction parallel to a width of the base sheet and a second axis extending in a direction parallel to a length of the base sheet. The handle interface is positioned on the base sheet. The handle interface includes a pocket sheet coupled to a surface of the base sheet. The pocket sheet and the base sheet cooperatively define (i) a pocket cavity between the pocket sheet and the base sheet and (ii) a first opening configured to allow access into the pocket cavity. The first opening is configured to receive a hand of an operator of the sheet assembly.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
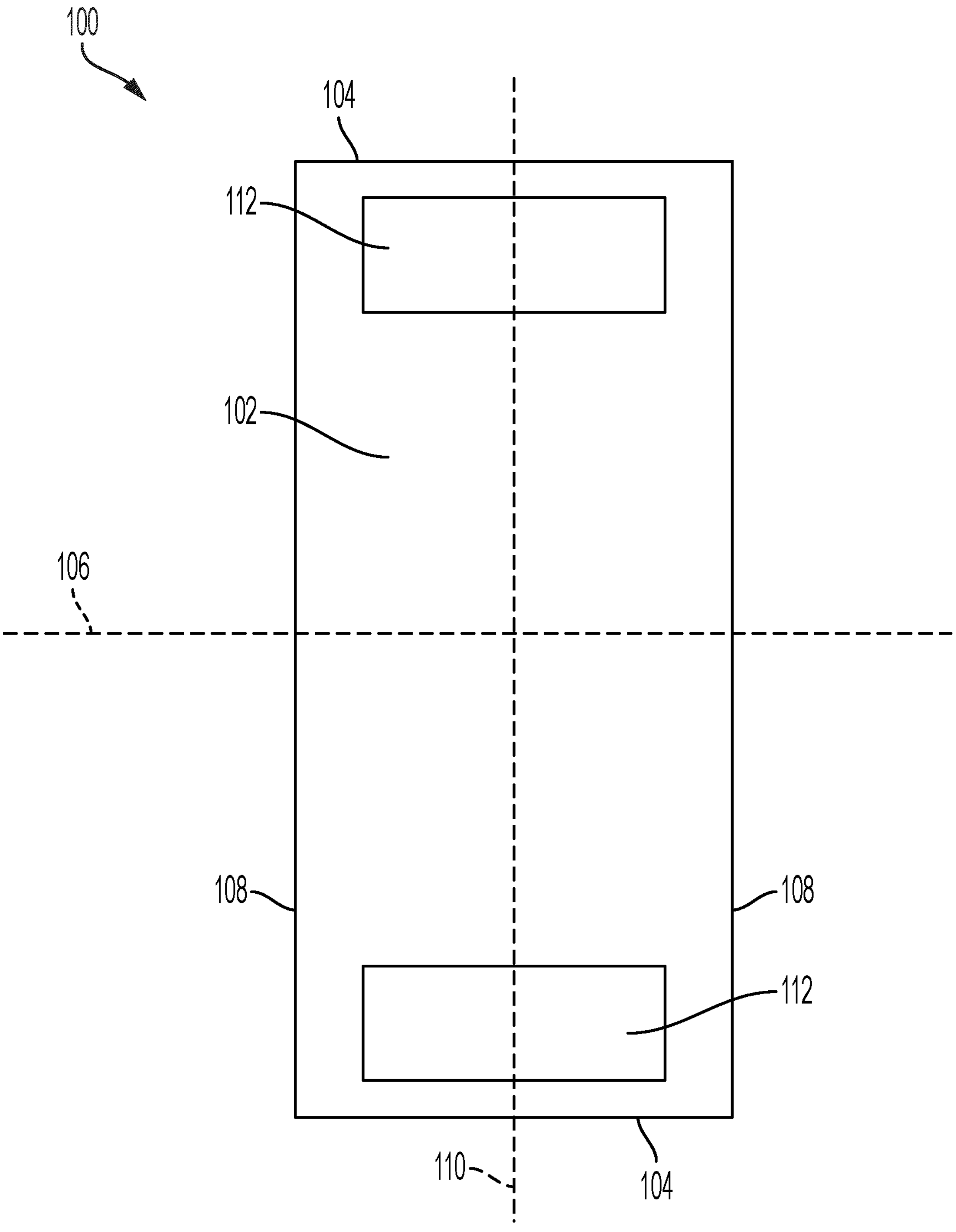
FIG. 1 is a top view of an example sheet assembly.

It will be recognized that some or all of the Figures are schematic representations for purposes of illustration. The Figures are provided for the purpose of illustrating one or more implementations with the explicit understanding that they will not be used to limit the scope or the meaning of the claims.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

I. Overview

Some draw sheets (e.g., a sheet assembly, a lift sheet, a transfer sheet, etc.) include a sheet (e.g., a sheet of fabric, a linen, etc.) configured to be placed (e.g., positioned, etc.) by a caregiver (e.g. an operator, a doctor, a nurse, a health care worker, a clinician, etc.) between a patient (e.g., client, person, individual, etc.) positioned on a surface (e.g., a bed, an exam table, an operating table, etc.) and the surface. The caregiver may grasp (e.g., grab, engage, etc.) the draw sheet in order to move (e.g., reposition, adjust, turn, transfer, etc.) the patient positioned on the draw sheet. The draw sheet may assist the caregiver in moving the patient safely and comfortable while minimizing strain or injury to the caregiver and the patient. For example, a patient may be lying (e.g., positioned, etc.) in a bed on a first side (e.g., a left side, etc.) of the patient and a clinician may desire to turn the patient from the first side onto a second side (e.g., a right side, etc.) to prevent pressure ulcers and/or discomfort from prolonged immobility. The clinician may position the draw sheet between a portion of the patient (e.g., a torso of the patient, a chest of the patient, etc.) and the bed and grasp the draw sheet and manipulate the draw sheet to turn the patient from the first side to the second side.

When moving a patient, a caregiver may grasp the draw sheet at locations across the sheet of the draw sheet. For example, the caregiver may grasp the draw sheet at a first end of the draw sheet when lifting a patient. However, because the draw sheet is a flat sheet, they are undesirable for caregivers who have difficulty grasping the flat sheet. It may be difficult for a caregiver to grasp the draw sheet because there are no features of the draw sheet that may be engaged (e.g., wrapped around, inserted into, etc.) by the caregiver when grasping the draw sheet. As a result, the caregiver may inadvertently release (e.g., drop, etc.) the draw sheet while attempting to move the patient, which could lead to injury to the patient (e.g., due to being dropped, due to being released in a non-preferred orientation, etc.). Additionally, caregivers may grasp the draw sheet for significant amounts of time (e.g., a long distance carry, holding a patient in place during an operation, etc.). As a result, the caregivers grasp on the draw sheet may loosen (e.g., weaken, etc.) over time, which could also lead to injury to the patient or the caregiver separating (e.g., splitting, etc.) moving the patient into separate steps that may take additional time compared to moving the patient in a single step.

Additionally, when caregivers grasp the draw sheet that is the flat sheet, the draw sheet may become bunched up (e.g., compressed, etc.) around (e.g., proximate, etc.) the location where the caregiver grasped the draw sheet. As a result, the draw sheet may press into (e.g., cut into, dig into, etc.) the hands of the caregiver while the caregiver is positioning the patient. The draw sheet may also become bunched up around the patient when the caregiver grasps the draw sheet, reducing a contact surface between the patient and the draw sheet and increasing a likelihood of the draw sheet becoming displaced relative to the patient when the caregiver attempts to reposition the patient instead of repositioning the patient with the draw sheet. For example, when the patient is displaced relative to the draw sheet, the draw sheet may be repositioned relative to the surface that the patient is positioned on without the patient being repositioned relative to the surface.

Additionally, draw sheets that are positioned under a patient may press into (e.g., cut into, dig into, etc.) the patient when the caregiver is moving the patient. For example, the edges (e.g., peripheries, etc.) of the draw sheet may press into the skin (e.g., flesh, etc.) of the patient when the caregiver lifts the patient using the draw sheet. This may be especially prevalent for patients with delicate skin (e.g., elderly patients, patients prone to bruising, etc.) who may be injured by the draw sheet pressing into their skin.

Implementations described herein are related to a draw sheet that do not require the operator to grasp the sheet of the draw sheet. Instead, the draw sheet includes handle interfaces (e.g., hand interfaces, handles, grips, holders, etc.) configured to allow for an operator of the draw sheet (e.g., a clinician, a doctor, a nurse, a health care worker, a caregiver etc.) to grasp (e.g., grab, engage, etc.) the draw sheet at the handle interfaces in order to move (e.g., reposition, adjust, turn, transfer, etc.) a patient positioned on the draw sheet. Additionally, the draw sheet described herein includes a cushion (e.g., a pad, a support, etc.) positioned on a top surface of the sheet of the draw sheet and configured to be located between the sheet of the draw sheet and the patient when the draw sheet is positioned under the patient. As a result, the cushion may limit the discomfort or injury to the patient caused by the draw sheet when the draw sheet is being used to move the patient. The cushion may also provide additional structural stability to the draw sheet and reducing the likelihood of the draw sheet bunching under the patient. As a result, the cushion may limit the risk of pressure injuries and/or skin breakdowns of the patient due to the draw sheet bunching under the patient and reduce the risk of the draw sheet slipping out from under the patient when the caregiver attempts to reposition the patient.

II. Overview of the Sheet Assembly

FIG. 1 depicts an example sheet assembly 100 (e.g., a repositioning sheet, a patient transfer sheet, a lift sheet, a transfer sheet, a draw sheet, a draw sheet assembly, etc.). As is described in more detail herein, the sheet assembly 100 is configured to be grasped by an operator 600 (e.g., a caregiver, a clinician, etc.) and operated by the operator 600 to move or reposition a patient 500 (e.g., a person, a client, etc.). In some embodiments, the sheet assembly 100 is flexible and foldable and has a top surface and a bottom surface. In some embodiments, the sheet assembly 100 may be operated by the operator 600 or a plurality of the operators 600 to move or reposition the patient 500 from one surface to another surface. For example, the sheet assembly 100 may be grasped by a first of the operators 600 and second of the operators 600 in order to move the patient 500 from a bed to an operating table.

As shown in FIG. 1, the sheet assembly 100 includes a base sheet 102 configured to be positioned between the patient 500 positioned on a surface and the surface. In some embodiments, the base sheet 102 is formed from a single piece of fabric. In other embodiments, the base sheet 102 is formed from a plurality of pieces of fabric that are coupled together (e.g., sewn together, attached with an adhesive, welded together, etc.). The base sheet 102 may be formed out of various types of fabric such as nylon, polyester, vinyl, low-density polyethylene, etc. The base sheet 102, or a portion thereof, may be configured to have a low coefficient of friction (e.g., formed out of a material with a low coefficient of friction, coated with a material with a low coefficient of friction, etc.) such that the sheet assembly 100 may be adjusted under the patient 500 by the operator 600. For example, the base sheet 102, or a portion thereof, may be coated with a silicone coating to reduce the coefficient of friction of the base sheet 102. In some embodiments, the base sheet 102 is formed and/or coated with materials that are easy to clean (e.g., materials that are compatible with cleaning products, materials that may be run through a laundry machine, etc.), materials that have antiseptic properties (e.g., materials that kill pathogens on contact, materials that are not conducing to hosting pathogens, etc.), and/or materials with a high durability (e.g., materials that may retain desired properties through multiple uses, etc.).

Figure 19:
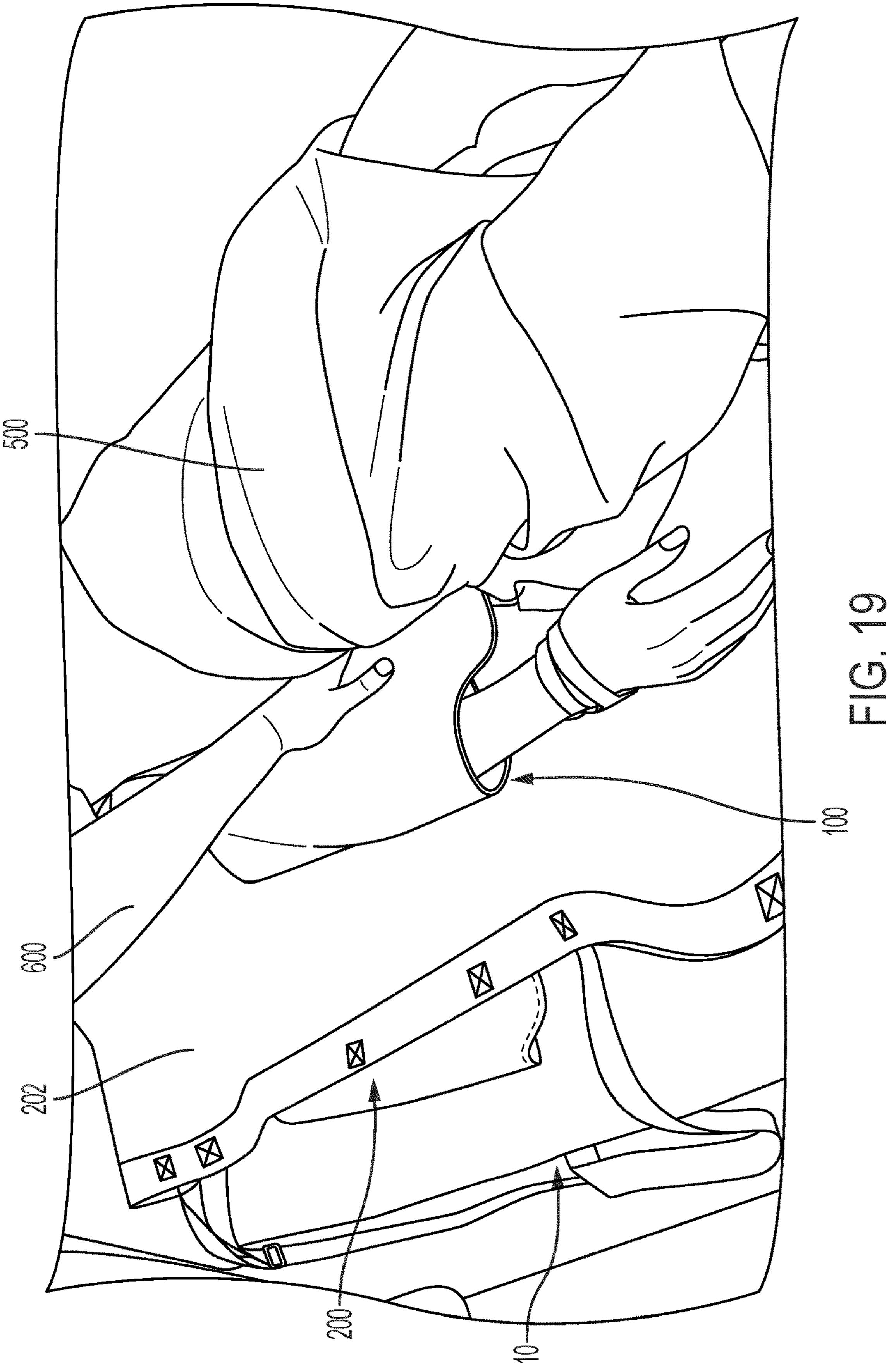
FIG. 19 is a perspective view of another example sheet assembly wrapped around an arm of a patient.

In some embodiments, a first portion of the base sheet 102 is configured to have the low coefficient of friction and a second portion of the base sheet 102 is configured to have a high coefficient of friction (e.g., a coefficient of friction higher than the coefficient of friction of the first portion of the base sheet 102, etc.). The first portion of the base sheet 102 may be formed out of a material with the high coefficient of friction and/or coated with a material with the high coefficient of friction. For example, a bottom surface of the base sheet 102 may have the low coefficient of friction such that the sheet assembly 100 may be adjusted under the patient 500 by the operator 600 and a top surface of the base sheet 102 may have the high coefficient of friction to reduce ethe possibility of the patient 500 slipping off of the pad 150 when the patient 500 is positioned on the top surface of the base sheet 102. As another example, the bottom surface of the base sheet 102 may have the low coefficient of friction such that the sheet assembly 100 may be adjusted under the patient 500 by the operator 600 and portions of the base sheet 102 proximate the crosswise edges 104 (e.g., outside portions, the top surface and the bottom surface proximate the crosswise edges 104, etc.) may have the high coefficient of friction to assist the operator 600 with grasping the base sheet 102 at the portions of the base sheet 102 proximate the crosswise edges 104. In operation as shown in FIG. 19, when the base sheet 102 is wrapped around an arm of the patient 500 the portions of the base sheet 102 with the high coefficient of friction may assist the operator 600 with holding the arm of the patient 500 in place by providing a higher coefficient of friction between the arm of the patient 500 and the base sheet 102 and/or the hand of the operator 600 and the base sheet 102.

Still referring to FIG. 1, the base sheet 102 includes a pair of crosswise edges 104 (e.g., first edges, a top edge and a bottom edge, lateral edges, etc.) and a pair of lengthwise edges 108 (e.g., second edges, a first side edge and a second side edge, longitudinal edges, etc.), according to some embodiments. A first of the crosswise edges 104 (e.g., a top edge, etc.) may be an edge positioned on an uppermost portion (e.g., a top portion, an upper portion, etc.) of the base sheet 102. A second of the crosswise edges 104 (e.g., a bottom edge, etc.) may be an edge positioned on a lowermost portion (e.g., a bottom portion, a lower portion, etc.) of the base sheet 102. A first of the lengthwise edges 108 (e.g., a left edge, a first side edge, etc.) may be an edge positioned on a leftmost portion (e.g., a left portion, a first side portion, etc.) of the base sheet 102. A second of the lengthwise edges 108 (e.g., a right edge, a second side edge, etc.) may be an edge positioned on a rightmost portion (e.g., a right portion, a right side portion, etc.) of the base sheet 102. In some embodiments, a first end of the first of the crosswise edges 104 may be coincident (e.g., contact, intersect, etc.) with a first end of the first of the lengthwise edges 108, a second end of the first of the crosswise edges 104 may be coincident with a first end of the second of the lengthwise edges 108, a first end of the second of the crosswise edges 104 may be coincident with a second end of the first of the lengthwise edges 108, and/or a second end of the second of the crosswise edges 104 may be coincident with a second end of the second of the lengthwise edges 108. In other embodiments, the crosswise edges 104 may be separated from the lengthwise edges 108 by other edges of the base sheet 102 (e.g., intermediate edges, etc.).

In some embodiments, the lengthwise edges 108 are each oriented orthogonal to one or both of the crosswise edges 104. For example, the base sheet 102 may have an orthogonal shape (e.g., a rectangular draw sheet, a square draw sheet, etc.) and the crosswise edges 104 may be oriented perpendicular to the lengthwise edges 108. In other embodiments, the base sheet 102 has another shape (e.g., hexagon, oval, circle, etc.) and the crosswise edges 104 are not oriented perpendicular to the lengthwise edges 108. The lengthwise edges 108 may be longer than the crosswise edges 104, the crosswise edges 104 may be longer than the lengthwise edges 108, or the crosswise edges 104 and the lengthwise edges 108 may be the same length. In some embodiments, a width of the base sheet 102 is shorter than a length of the base sheet 102, the width of the base sheet 102 is longer than the length of the sheet, or the width of the base sheet 102 is the same length as the length of the base sheet 102.

The base sheet 102 defines a first axis 106 (e.g., a crosswise axis, a width axis, etc.) extending in a direction parallel to a width of the base sheet 102 (e.g., across a width of the sheet, etc.) and centered along a length of the base sheet 102. In some embodiments, the crosswise edges 104 are oriented parallel to the first axis 106 and/or the lengthwise edges 108 are oriented perpendicular to the first axis 106. The base sheet 102 may have a first end on a first side of the first axis 106 (e.g., a top end on a top side of the first axis 106, etc.) and a second end on a second side of the first axis 106 (e.g., a bottom end on a bottom side of the first axis 106, etc.) opposing the first side of the first axis 106. The base sheet 102 defines a second axis 110 (e.g., a lengthwise axis, a length axis, etc.) extending in a direction parallel to a length of the base sheet 102 (e.g., across a length of the sheet, etc.) and centered along a width of the base sheet 102. The base sheet 102 may have a first side on a first side of the second axis 110 (e.g., a right side to the right of the second axis 110, etc.) and a second side on a second side of the second axis 110 (e.g., a left side to the left of the second axis 110, etc.) opposing the first side of the second axis 110. In some embodiments, the lengthwise edges 108 are oriented parallel to the second axis 110 and/or the crosswise edges 104 are oriented perpendicular to the second axis 110.

As shown in FIG. 1, the sheet assembly 100 includes a plurality of handle interfaces 112 (e.g., a first handle interface, a second handle interface, a third handle interface, a fourth handle interface, etc.) configured to be grasped (e.g., grabbed, gripped, etc.) by the hands of the operator 600, according to some embodiments. In some embodiments, a first of the handle interfaces 112 is positioned on the first end of the base sheet 102 and a second of the handle interfaces 112 is positioned on a second end of the base sheet 102. For example, the first of the handle interfaces 112 may be positioned on a first side of the first axis 106 and the second of the handle interfaces 112 may be positioned on a second side of the first axis 106. In some embodiments, a first of the handle interfaces 112 and a second of the handle interfaces are positioned on the first end of the base sheet 102 and a third of the handle interfaces 112 and a fourth of the handle interfaces 112 are positioned on the second end of the base sheet 102.

In some embodiments, the sheet assembly 100 may include a pair of the handle interfaces 112 positioned proximate (e.g., next to, etc.) each of the crosswise edges 104. For example, a first of the handle interfaces 112 may be positioned a first distance from a first of the crosswise edges 104 and a second of the handle interfaces 112 may be positioned a second distance from a second of the crosswise edges 104. In some embodiments, the first distance of the first of the handle interfaces 112 from the first of the crosswise edges 104 is equal to the second distance of the second of the handle interfaces 112 from the second of the crosswise edges 104. In other embodiments, the first distance of the first of the handle interfaces 112 from the first of the crosswise edges 104 is greater than the second distance of the second of the handle interfaces 112 from the second of the crosswise edges 104.

The sheet assembly 100 may include a first plurality of the handle interfaces 112 positioned proximate a first of the crosswise edges 104 (e.g., a top edge, etc.) and spaced apart along a first portion of the second axis 110 and a second plurality of handle interfaces 112 positioned proximate a second of the crosswise edges 104 (e.g., a bottom edge, etc.) and spaced apart along a second portion of the second axis 110. For example, the first plurality of the of the handle interfaces 112 may include three of the handle interfaces 112 with a first of the handle interfaces 112 of the first plurality of the handle interfaces 112 positioned proximate the first of the crosswise edges 104 and the second and the third of the handle interfaces 112 of the first plurality of the handle interfaces 112 spaced from the first of the handle interfaces 112 of the first plurality of the handle interfaces 112 away from the first of the crosswise edges 104 along the first portion of the second axis 110.

In some embodiments, the handle interfaces 112 of the first plurality of the handle interfaces 112 and/or the handle interfaces 112 of the second plurality of the handle interfaces 112 may be evenly spaced apart along the second axis 110. For example, a first of the handle interfaces 112 of the first plurality of handle interfaces 112 may be positioned three inches from the first of the crosswise edges 104, a second of the handle interfaces 112 of the first plurality of handle interfaces 112 may be positioned three inches from the first of the handle interfaces 112 of the first plurality of handle interfaces 112, and a third of the handle interfaces 112 of the first plurality of handle interfaces 112 may be positioned three inches from the second of the handle interfaces 112 of the first plurality of handle interfaces 112. In other embodiments, the handle interfaces 112 of the first plurality of the handle interfaces 112 and/or the handle interfaces 112 of the second plurality of the handle interfaces 112 may be unevenly spaced apart along the second axis 110. In still other embodiments, the sheet assembly 100 includes one of the handle interfaces 112 positioned proximate one of the crosswise edges 104 (e.g., the top edge, the bottom edge, etc.).

As shown in FIGS. 2-5, each of the handle interfaces 112 defines a plurality of openings 114 (e.g., apertures, buttonholes, holes, slots, a first opening, a second opening, a third opening, a fourth opening, etc.) configured to receive a hand of the operator of the sheet assembly 100, according to some embodiments. In some embodiments, the openings 114 are each formed as slits in the base sheet 102 to allow for the operator 600 to extend their hand through one of the openings 114 to grasp the sheet assembly 100. In other embodiments, the openings 114 are slots and/or circular holes in the base sheet 102 to allow for the operator 600 to extend their hand through one of the openings 114 to grasp the sheet assembly 100. In other embodiments, each of the handle interfaces 112 defines one of the openings 114.

Figure 2:
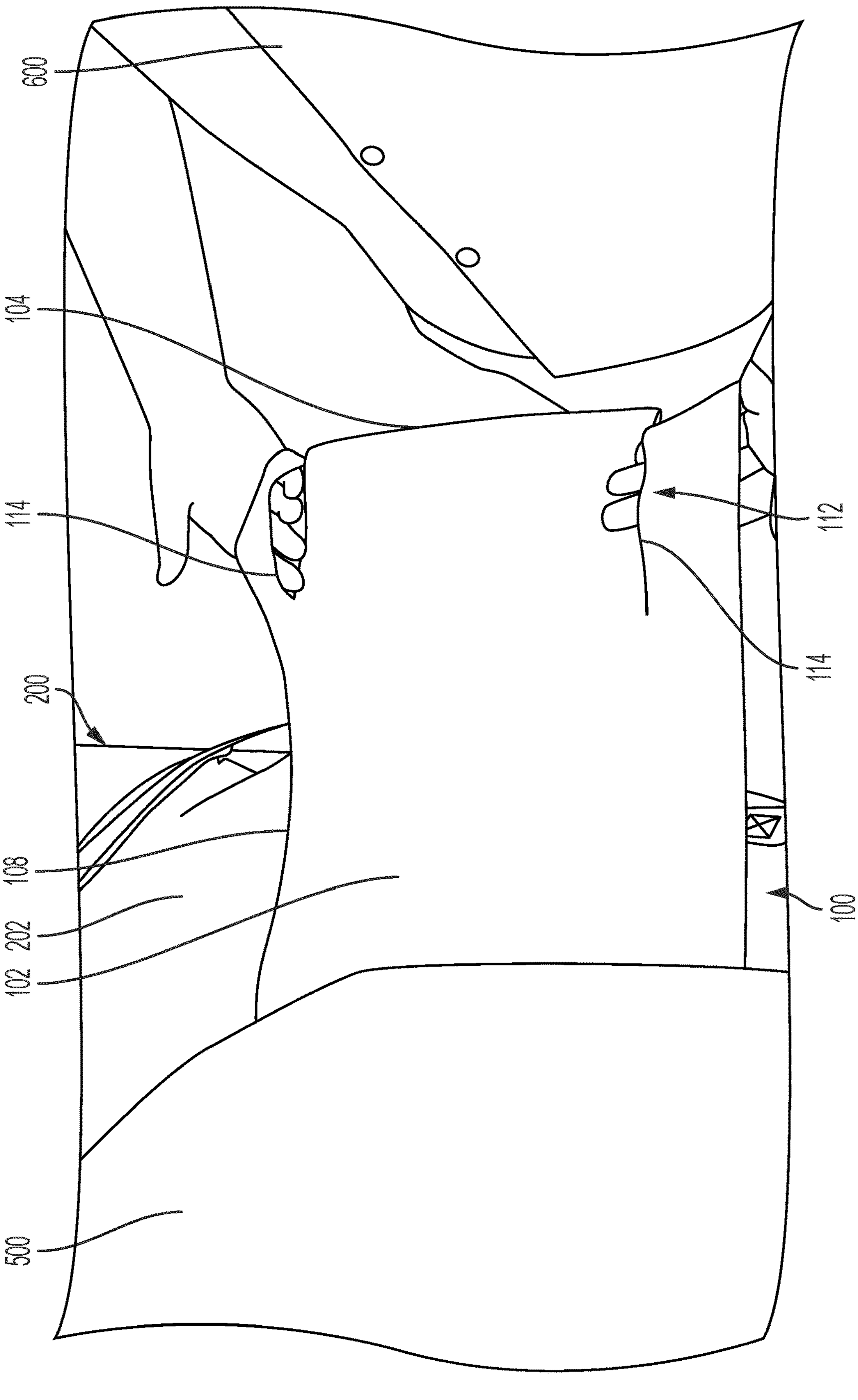
FIG. 2 is a perspective view of an example sheet assembly positioned under a patient.
Figure 3:
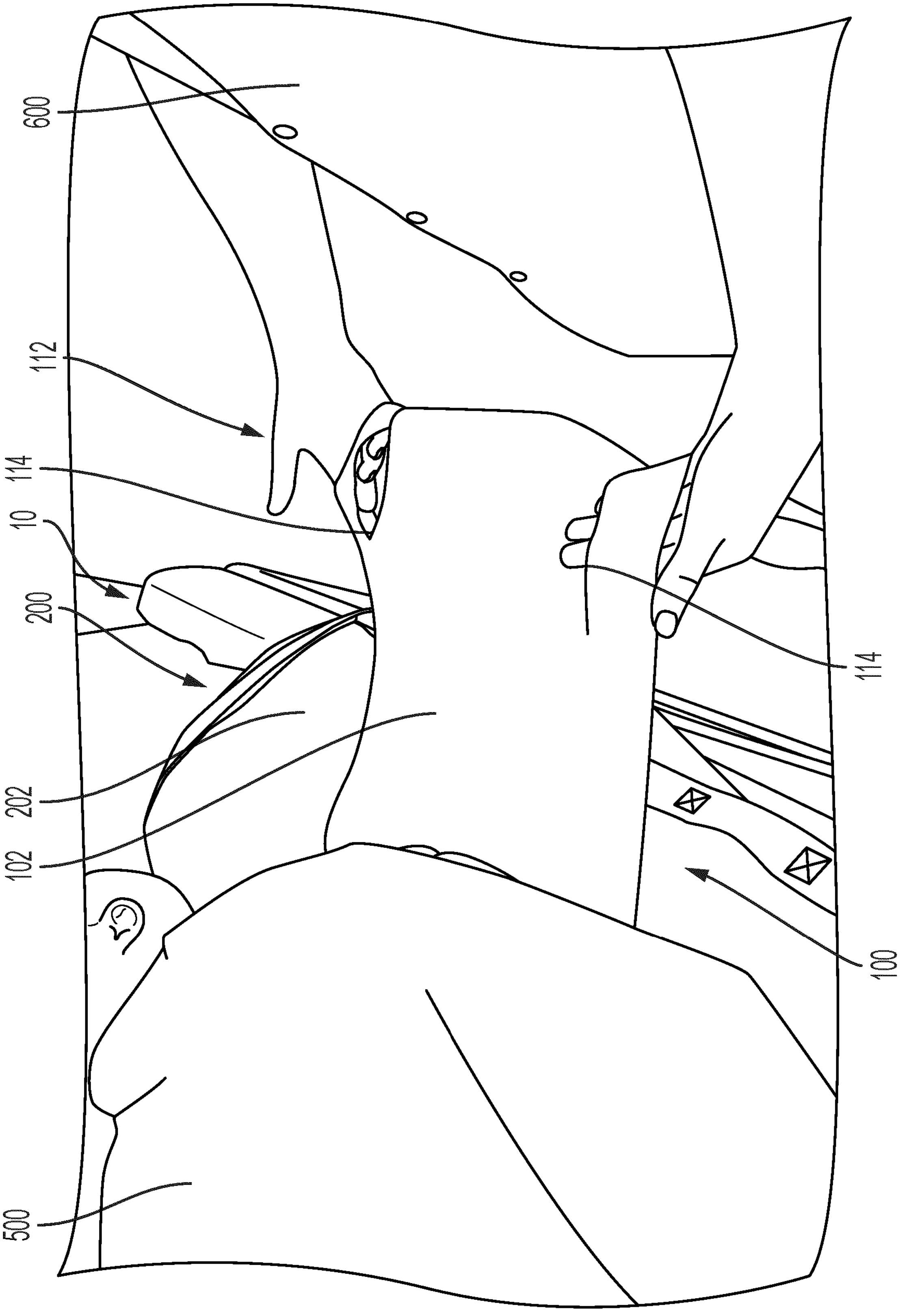
FIG. 3 is another perspective view of the sheet assembly of FIG. 2.

As shown in FIGS. 2 and 3, the openings 114 may be oriented parallel to the second axis 110 (e.g., as lengthwise buttonholes, etc.) to allow for the operator 600 to extend their hand through one of the openings 114 from a direction parallel to the first axis 106 to grasp the sheet assembly 100, according to some embodiments. In some embodiments, when the openings 114 are oriented parallel to the second axis 110, the openings 114 may each be positioned a distance from one of the lengthwise edges 108 to allow for the operator to extend their hand through one of the openings 114 and grasp the one of the openings 114 and a portion of the one of the lengthwise edges 108 that is the distance from the one of the openings 114 in order to grasp the sheet assembly 100.

Figure 4:
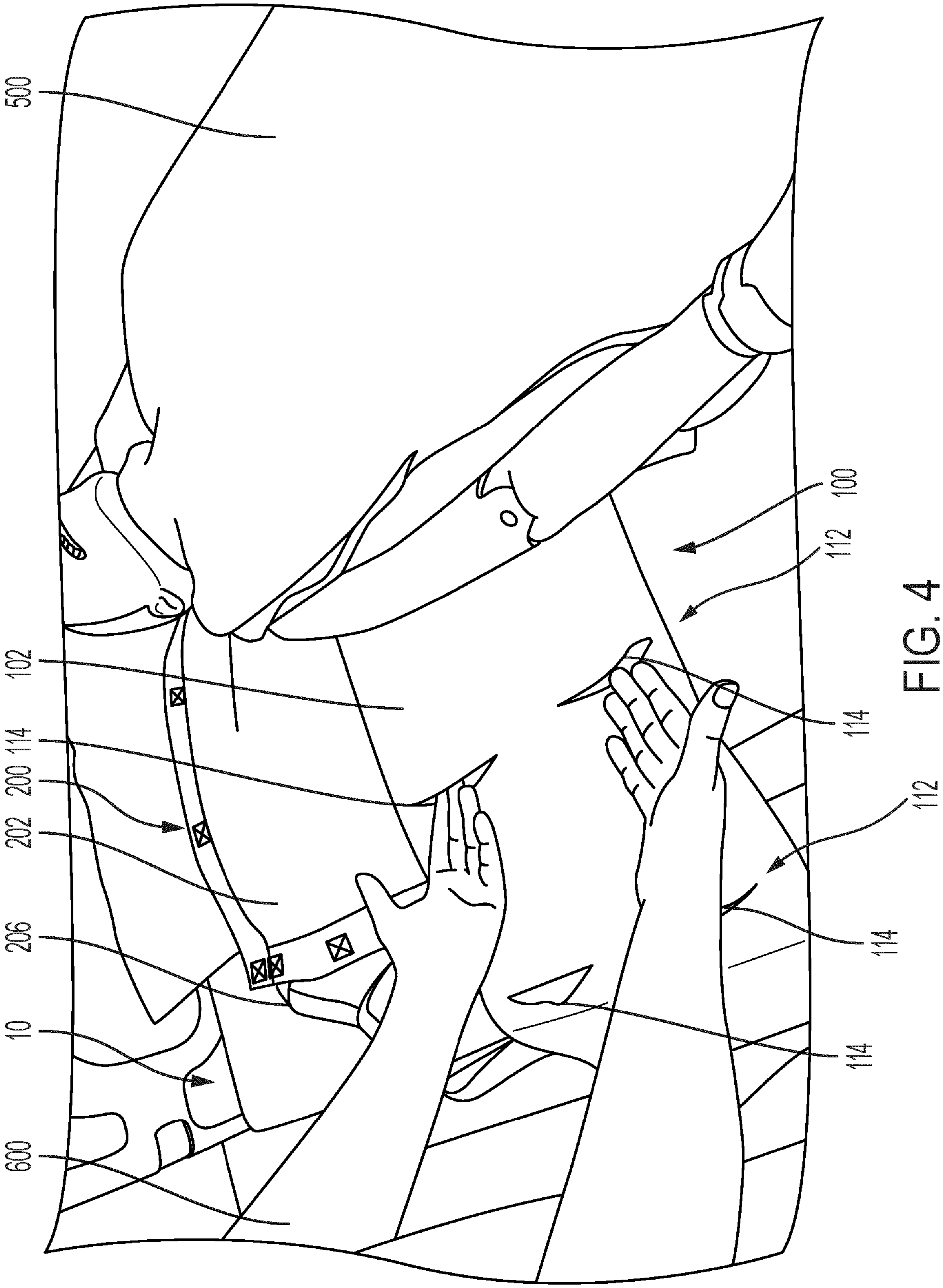
FIG. 4 is a perspective view of another example sheet assembly positioned under a patient.
Figure 5:
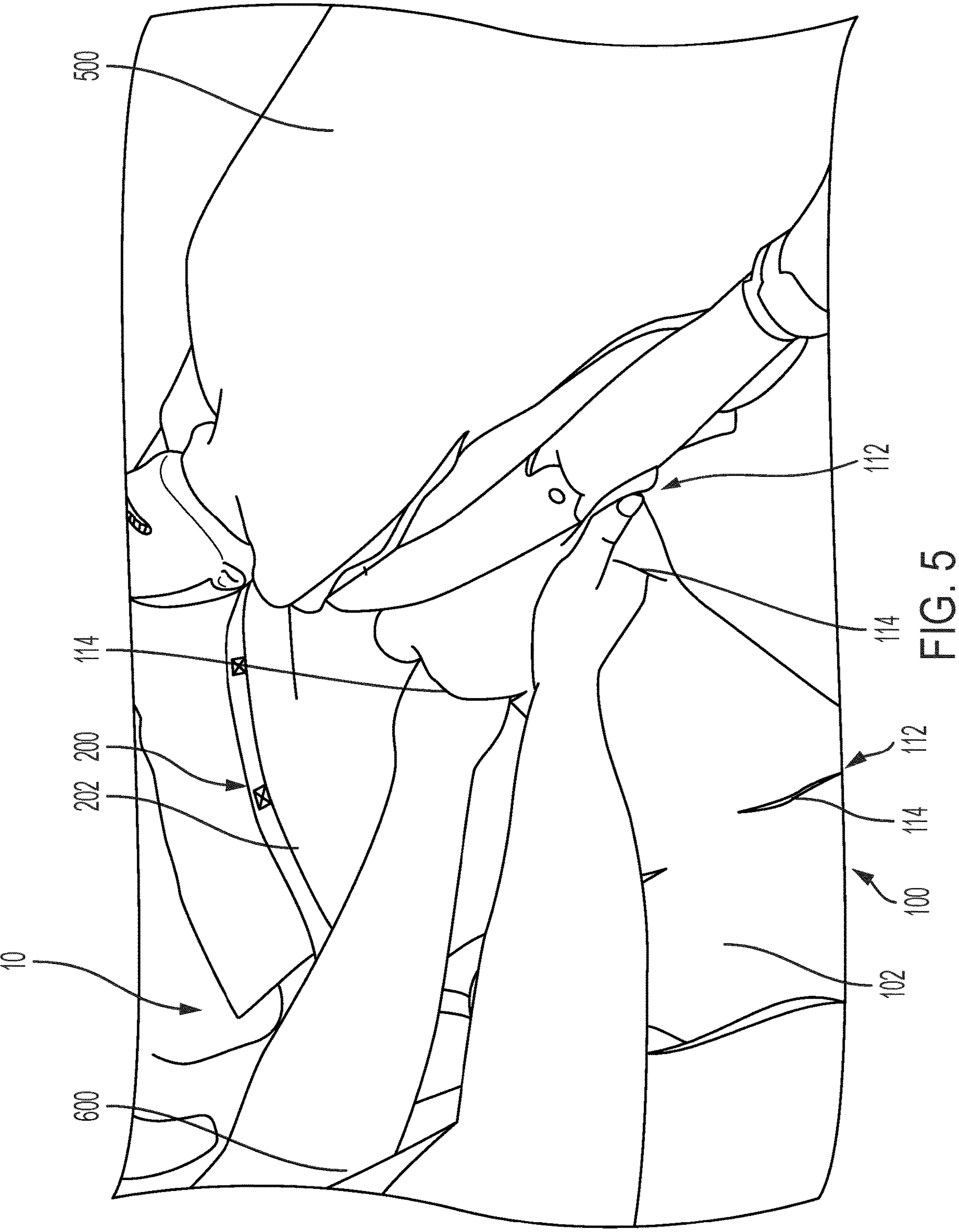
FIG. 5 is another perspective view of the sheet assembly of FIG. 4.
Figure 6:
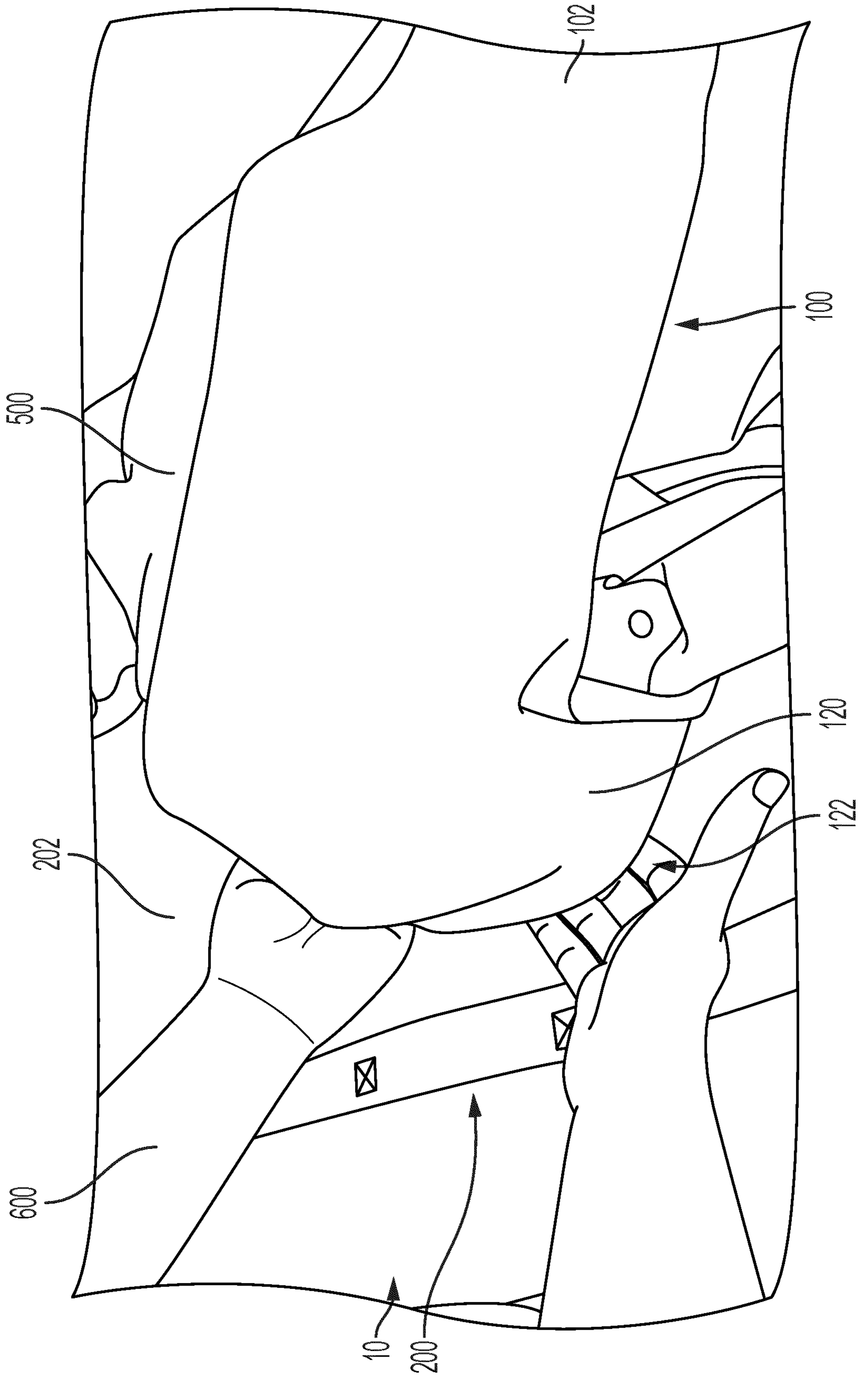
FIG. 6 is a perspective view of another example sheet assembly positioned under a patient.

As shown in FIGS. 4 and 5, the openings 114 may be oriented parallel to the first axis 106 (e.g., as crosswise buttonholes, etc.) to allow for the operator 600 to extend their hands through the openings 114 from a direction parallel to the second axis 110 to grasp the sheet assembly 100, according to some embodiments. In some embodiments, when the openings 114 are oriented parallel to the second axis 110, the openings 114 may each be positioned a distance from one of the crosswise edges 104 to allow for the operator 600 to extend their hand through one of the openings 114 and grasp the one of the openings 114 and a portion of the one of the crosswise edges 104 that is the distance from the one of the openings 114 in order to grasp the sheet assembly 100.

In other embodiments, the openings 114 may be oriented at an angle (e.g., an angle other than perpendicular or parallel, etc.) relative to the first axis 106 and/or the second axis 110 (e.g., as angled buttonholes, angled apertures, etc.). For example, the openings 114 may be oriented at a thirty degree angle from the first axis 106 to allow for the operator 600 to extend their hands through the angled openings from a direction at an entrance angle perpendicular to the angled openings to grasp the sheet assembly 100. In some embodiments, when the openings 114 are oriented at the angle relative to the first axis 106, the openings 114 may each be positioned a distance from an intersection of one of the crosswise edges 104 and one of the lengthwise edges 108 (e.g., a distance from a corner of the base sheet 102, etc.) to allow for the operator 600 to extend their hand through one of the openings 114 and grasp (i) the one of the openings 114 and (ii) a portion of the one of the crosswise edges 104 and a portion of the one of the lengthwise edges 108 that are proximate the intersection of the one of the crosswise edges 104 and the one of the lengthwise edges 108 that is the distance from the one of the openings 114.

The openings 114 of each of the handle interfaces 112 may be positioned parallel to each other in the direction parallel to the first axis 106. The openings 114 of each of the handle interfaces 112 may be spaced apart along at least a portion of the first axis 106. For example, a first of the openings 114 of one of the handle interfaces 112 may be positioned proximate a first of the lengthwise edges 108 and a second of the openings 114 of the one of the handle interfaces 112 may be spaced from the first of the openings 114 along the first axis 106 such that the second of the openings 114 is positioned proximate a second of the lengthwise edges 108. In some embodiments, each of the handle interfaces 112 defines a pair of the openings 114. For example, each of the handle interfaces 112 may include a first of the openings 114 and a second of the openings 114 spaced apart along the first axis 106. In other embodiments, each of the handle interfaces 112 includes more than two of the openings 114 spaced apart along the first axis 106 (e.g., a third of the openings 114, a fourth of the openings 114, etc.).

In some embodiments, the openings 114 of at least one of the handle interfaces 112 may be evenly spaced apart along the first axis 106. For example, a first of the openings 114 of the at least one of the handle interfaces 112 may be positioned two inches away from a first of the lengthwise edges 108, a second of the openings 114 of the at least one of the handle interfaces 112 may be positioned two inches away from the first of the openings 114 of the at least one of the handle interfaces 112, and a third of the openings 114 of the at least one of the handle interfaces 112 may be positioned two inches away from the second of the openings 114 of the at least one of the handle interfaces 112. In other embodiments, the openings 114 of at least one of the handle interfaces 112 may be unevenly spaced apart along the first axis 106. For example, a first of the openings 114 of at least one of the handle interfaces 112 may be positioned two inches away from a first of the lengthwise edges 108, a second of the openings 114 of the at least one of the handle interfaces 112 may be positioned three inches away from the first of the openings 114 of the at least one of the handle interfaces 112, and a third of the openings 114 of the at least one of the handle interfaces 112 may be positioned four inches away from the second of the openings 114 of the at least one of the handle interfaces 112.

In some embodiments, a length of each of the openings 114 in the direction parallel to the second axis 110 is equal for each of the handle interfaces 112. For example, each of the openings 114 defined in the base sheet 102 may have an equal length in the direction parallel to the second axis 110 configured such that a majority of the operators 600 may extend their hands through the openings 114 to grasp the sheet assembly 100 (e.g., the openings 114 may be configured as "one size fits all", etc.). In other embodiments, a length of each of the openings 114 defined by each of the handle interfaces 112 are different (e.g., vary, etc.) in the direction parallel to the second axis 110. For example, a first length of a first of the openings 114 of the handle interfaces 112 may be configured to fit a hand of the operators 600 with a small sized hand, a second length of a second of the openings 114 of the handle interfaces 112 may be longer than the first length of the first of the openings 114 and may be configured to fit a hand of the operators 600 with a medium sized hand, and a third length of a third of the openings 114 of the handle interfaces 112 may be longer than the second length of the second of the openings 114 and may be configured to fit a hand of the operators 600 with a large sized hand.

In still other embodiments, the length of each of the openings 114 in the direction parallel to the second axis 110 varies for each of the handle interfaces 112. For example, a first length of the openings 114 defined by a first of the handle interfaces 112 may be configured to fit a hand of the operators 600 with a small sized hand, a second length of the openings 114 defined by a second of the handle interfaces 112 may be longer than the first length of the openings 114 defined by the first of the handle interfaces 112 and may be configured to fit a hand of the operators 600 with a medium sized hand, and a third length of the openings 114 defined by a third of the handle interfaces 112 may be longer than the second length of the openings 114 defined by the second of the handle interfaces 112 and may be configured to fit a hand of the operators 600 with a large sized hand.

As shown in FIGS. 6, 7, and 12-16, each of the handle interfaces 112 includes a pocket sheet 120 (e.g., a pocket sheet, a second sheet, etc.) coupled (e.g., stitched, adhered, welded, etc.) to the base sheet 102 at the each of the handle interfaces 112, according to some embodiments. The pocket and the base sheet 102 cooperatively define a pocket cavity 122 (e.g., an opening, etc.) positioned between the base sheet 102 and the pocket sheet 120. The pocket sheet 120 may be configured to allow for the operator 600 to extend their hand into the pocket cavity 122 to grasp (i) an inside surface of the pocket sheet 120 partially defining the pocket cavity 122 and/or an inside surface of the base sheet 102 partially defining the pocket cavity 122 and/or (ii) an outside surface of the pocket sheet 120 opposite the inside surface of the base sheet 102 partially defining the pocket cavity 122 and/or an outside surface of the base sheet 102 opposite the inside surface of the base sheet 102 partially defining the pocket cavity 122.

In some embodiments, the base sheet 102 and the pocket sheet 120 may collectively define a pocket opening 124 (e.g., a pocket window, etc.) configured to allow access into the pocket cavity 122 to allow for the operator 600 to extend their hand into the pocket cavity 122 to grasp the sheet assembly 100. For example, a first handle interface may include a first of the pocket sheets 120 coupled to the base sheet 102 and the first of the pocket sheets 120 and the base sheet 102 may cooperatively define (i) a first of the pocket cavities 122 between the first of the pocket sheets 120 and the base sheet 102 and the first of the pocket sheets 120 and (ii) a first of the pocket openings 124 configured to allow access into the first of the pocket cavities 122 to allow for the operator 600 to extend their hand into the first of the pocket cavities 122 to grasp the sheet assembly 100. A second of the handle interfaces 112 may include a second of the pocket sheets 120 coupled to the base sheet 102 and the second of the pocket sheets 120 and the base sheet 102 may cooperatively define (i) a second of the pocket cavities 122 between the second of the pocket sheets 120 and the base sheet 102 and (ii) a second of the pocket openings 124 configured to provide access into the second of the pocket cavities 122 to allow for the operator 600 to extend their hand into the second of the pocket cavities 122 to grasp the sheet assembly 100.

In some embodiments, at least a portion of one of the edges of the pocket sheet 120 may not be coupled to the base sheet 102 and the at least one portion of the one of the edges of the pocket sheet 120 and a portion of the base sheet 102 opposing the at least one portion of the one of the edges of the pocket sheet 120 may collectively define the pocket opening 124. In various embodiments, the base sheet 102 and the pocket sheet 120 collectively define a plurality of the pocket opening 124 (e.g., a first of the pocket opening 124, a second of the pocket opening 124, etc.). In other embodiments, the pocket sheet 120 defines a pocket aperture through the pocket sheet 120 to the pocket cavity 122 to allow for the operator 600 to extend their hand through the pocket aperture into the pocket cavity 122 to grasp the sheet assembly 100. In still other embodiments, the base sheet 102 defines a pocket aperture through the base sheet 102 to the pocket cavity 122 to allow for the operator 600 to extend their hand through the pocket aperture into the pocket cavity 122 to grasp the sheet assembly 100.

In some embodiments, the pocket sheet 120 is formed from a single piece of fabric. In other embodiments, the pocket sheet 120 is formed from a plurality of pieces of fabric that are coupled together (e.g., sewn together, attached with an adhesive, welded together, etc.). The pocket sheet 120 may be formed out of various types of fabric such as nylon, polyester, vinyl, low-density polyethylene, etc. The pocket sheet 120 may be configured to have a high coefficient of friction (e.g., formed out of a material with a high coefficient of friction, coated with a material with a high coefficient of friction, etc.) such that the operator 600 may grasp the pocket sheet 120. For example, the pocket sheet 120 may be coated with a rubber coating to increase the coefficient of friction of the pocket sheet 120. In some embodiments, the pocket sheet 120 is formed and/or coated with materials that are easy to clean (e.g., materials that are compatible with cleaning products, materials that may be run through a laundry machine, etc.), materials that have antiseptic properties (e.g., materials that kill pathogens on contact, materials that are not conducing to hosting pathogens, etc.), and/or materials with a high durability (e.g., materials that may retain desired properties through multiple uses, etc.). In some embodiments, the pocket sheet 120 is formed out of the same material and/or coated with the same coating as the base sheet 102. In other embodiments, the pocket sheet 120 is formed out of a different material and/or coated with a different coating as the base sheet 102. For example, the base sheet 102 may be coated with a silicon coating to reduce the coefficient of friction of the base sheet 102 and the pocket sheet 120 may be coated with a rubber coating to increase the coefficient of friction of the pocket sheet 120 such that the coefficient of friction of the pocket sheet 120 is higher than the coefficient of friction of the base sheet 102.

As shown in FIGS. 6 and 11-13, the pocket sheet 120 is coupled to a bottom surface of the base sheet 102 such that the pocket cavity 122 is positioned below the base sheet 102 when the operator 600 extends their hand into the pocket cavity 122 to grasp the sheet assembly 100, according to some embodiments. For example, the pocket sheet 120 may be coupled to the bottom surface of the base sheet 102 to allow for the operator 600 to grasp the sheet assembly 100 from inside of the pocket cavity 122 on a bottom side of the base sheet 102. As shown in FIGS. 7-10 and 14-18, the pocket sheet 120 is coupled to a top surface of the base sheet 102 such that the pocket cavity 122 is positioned above the base sheet 102 when the operator 600 extends their hand into the pocket cavity 122 to grasp the sheet assembly 100, according to some embodiments. For example, the pocket sheet 120 may be coupled to the top surface of the base sheet 102 to allow for the operator 600 to grasp the sheet assembly 100 from inside of the pocket cavity 122 on a top side of the base sheet 102. It should be understood that the sheet assembly 100 of FIGS. 6 and 11-13 may be the same as the sheet assembly 100 of FIGS. 7-10 and 14-18, which can be manipulated such that in one positioning, the pocket sheet 120 and the pocket cavity 122 are positioned above the base sheet 102 and in a second positioning, the pocket sheet 120 and the pocket cavity 122 are positioned below the base sheet 102.

In various embodiments, the sheet assembly 100 includes both the handle interfaces 112 with the pocket sheet 120 coupled to the bottom surface of the base sheet 102 such that the pocket cavity 122 defined by the pocket sheet 120 is positioned below the base sheet 102 and the handle interfaces 112 with the pocket sheet 120 coupled to the top surface of the base sheet 102 such that the pocket cavity 122 defined by the pocket sheet 120 is positioned above the base sheet 102. For example, a first of the handle interfaces 112 may include one of the pocket sheet 120 coupled to the bottom surface of the base sheet 102 and a second of the handle interfaces 112 may include one of the pocket sheet 120 coupled to the top surface of the base sheet 102.

In some embodiments, when the sheet assembly 100 includes both the handle interfaces 112 with the pocket sheet 120 coupled to the bottom surface of the base sheet 102 and the handle interfaces 112 with the pocket sheet 120 coupled to the top surface of the base sheet 102, each of the handle interfaces 112 with the pocket sheet 120 coupled to the bottom surface of the base sheet 102 may be positioned in a mirror position to one of the handle interfaces 112 with the pocket sheet 120 coupled to the top surface of the base sheet 102. For example, if a first of the handle interfaces 112 with the pocket sheet 120 coupled to the top surface of the base sheet 102 is positioned three inches from one of the crosswise edges 104, a first of the handle interfaces 112 with the pocket sheet 120 coupled to the bottom surface of the base sheet 102 may be positioned three inches from the one of the crosswise edges 104.

As shown in FIGS. 6, 7, and 12-16, the pocket sheet 120 of the handle interface 112 is coupled to the base sheet 102 to orient the pocket opening 124 in a direction parallel to the second axis 110 of the sheet assembly 100, according to some embodiments. For example, the pocket sheet 120 and the base sheet 102 may collectively define the pocket opening 124 oriented in the direction parallel to the second axis 110 of the sheet assembly 100. When the pocket opening 124 is oriented in the direction parallel to the second axis 110, the operator 600 may extend their hand through the pocket opening 124 into the pocket cavity 122 in a direction parallel to the second axis 110 to grasp the sheet assembly 100. As another example, an axis (e.g., a third axis, a fourth axis, etc.) contiguous with an edge (e.g., a first edge, a second edge, etc.) of the pocket sheet 120 defining the pocket opening 124 may be parallel to the first axis 106 to orient the pocket cavity 122 in the direction parallel to the second axis 110.

Figure 7:
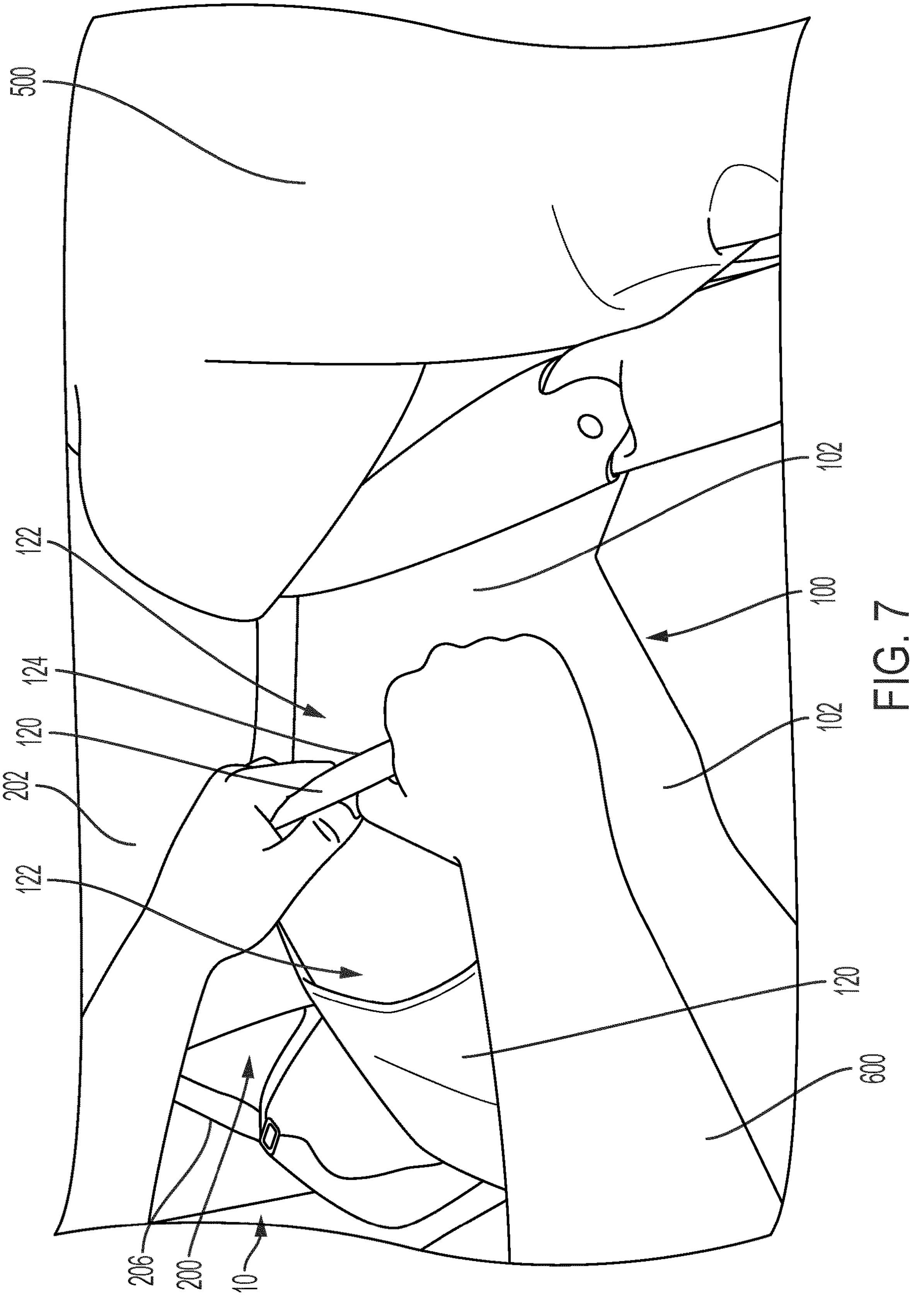
FIG. 7 is a perspective view of another example sheet assembly positioned under a patient.
Figure 8:
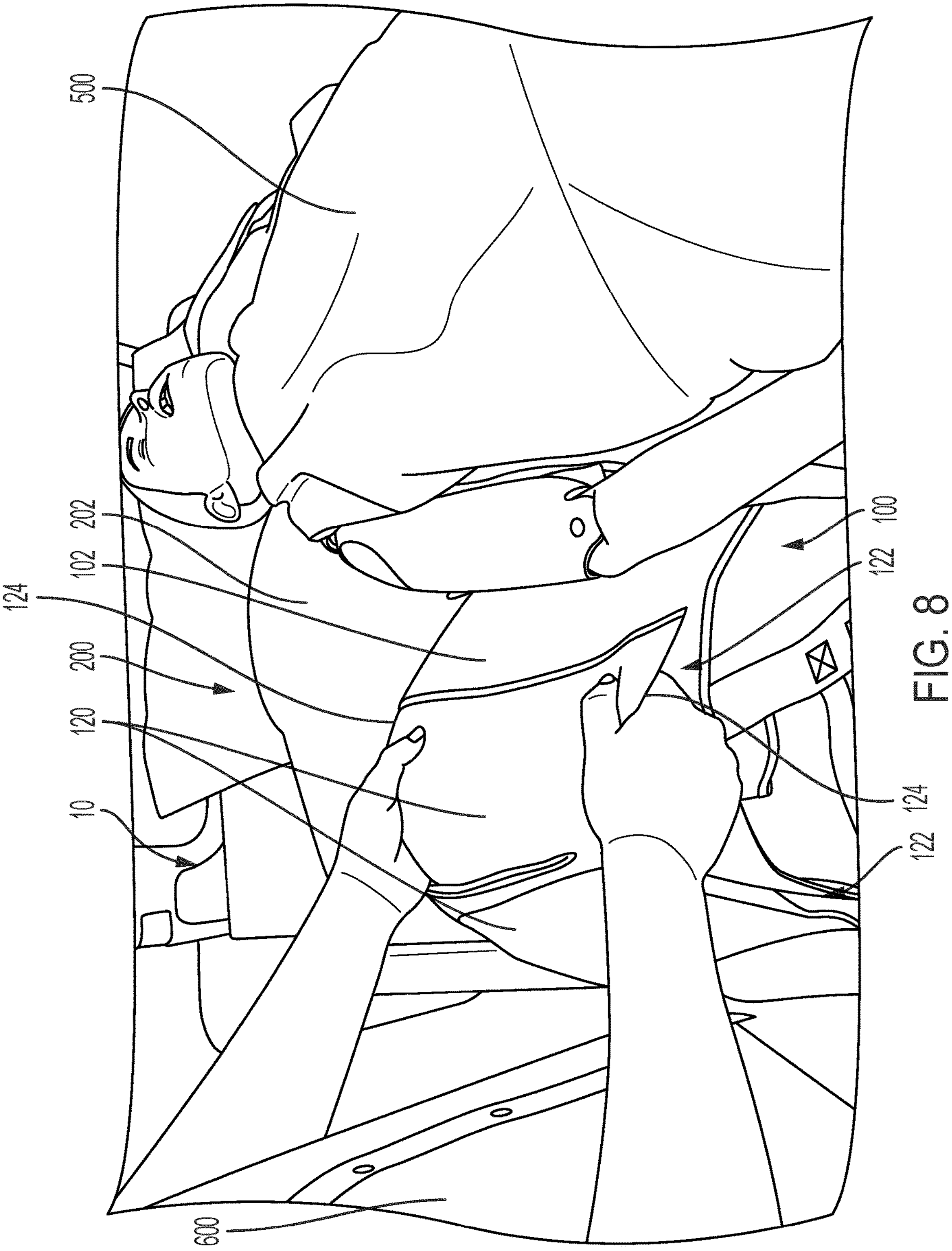
FIG. 8 is a perspective view of another example sheet assembly positioned under a patient.
Figure 9:
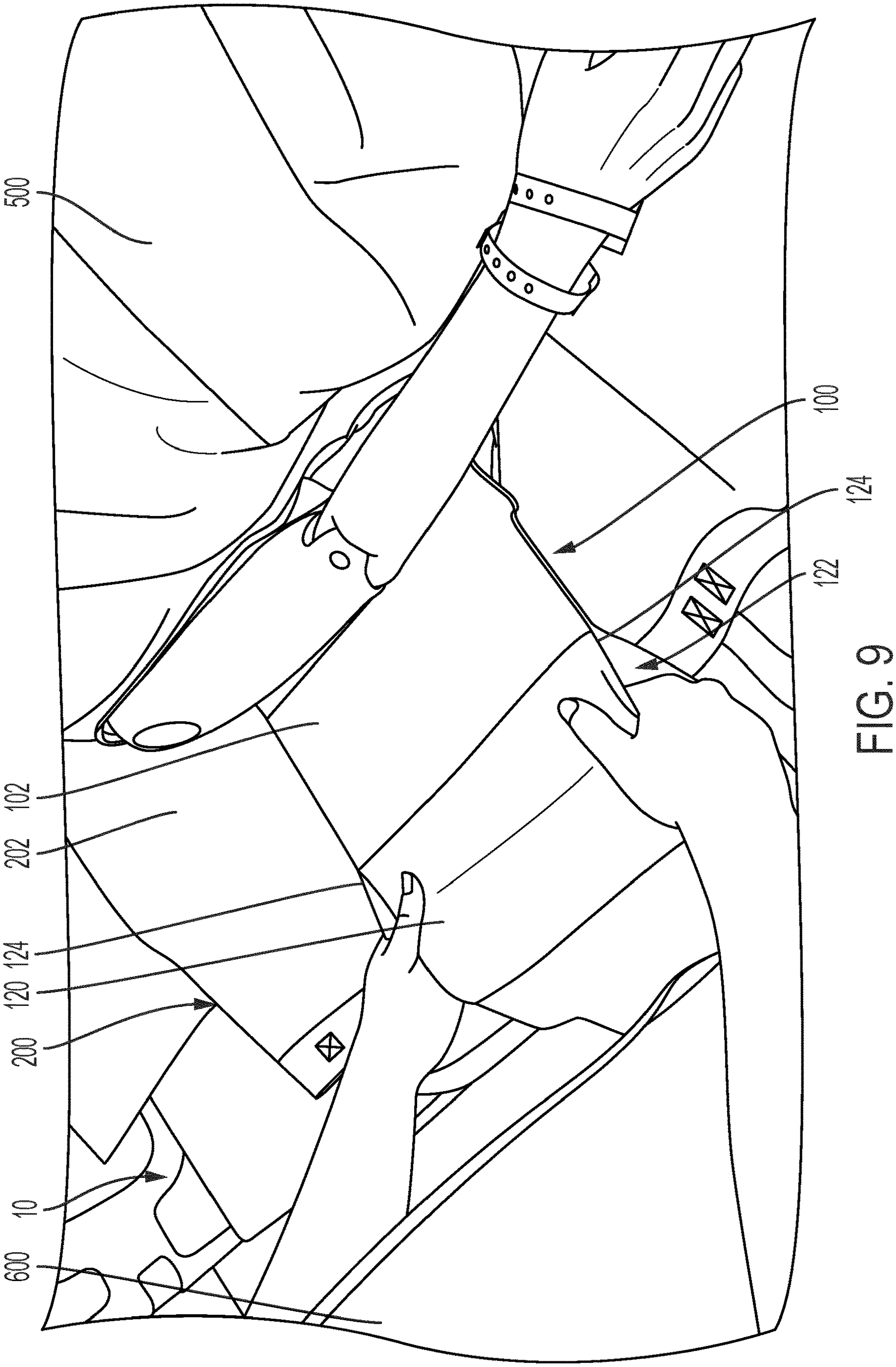
FIG. 9 is another perspective view of the sheet assembly of FIG. 8.
Figure 10:
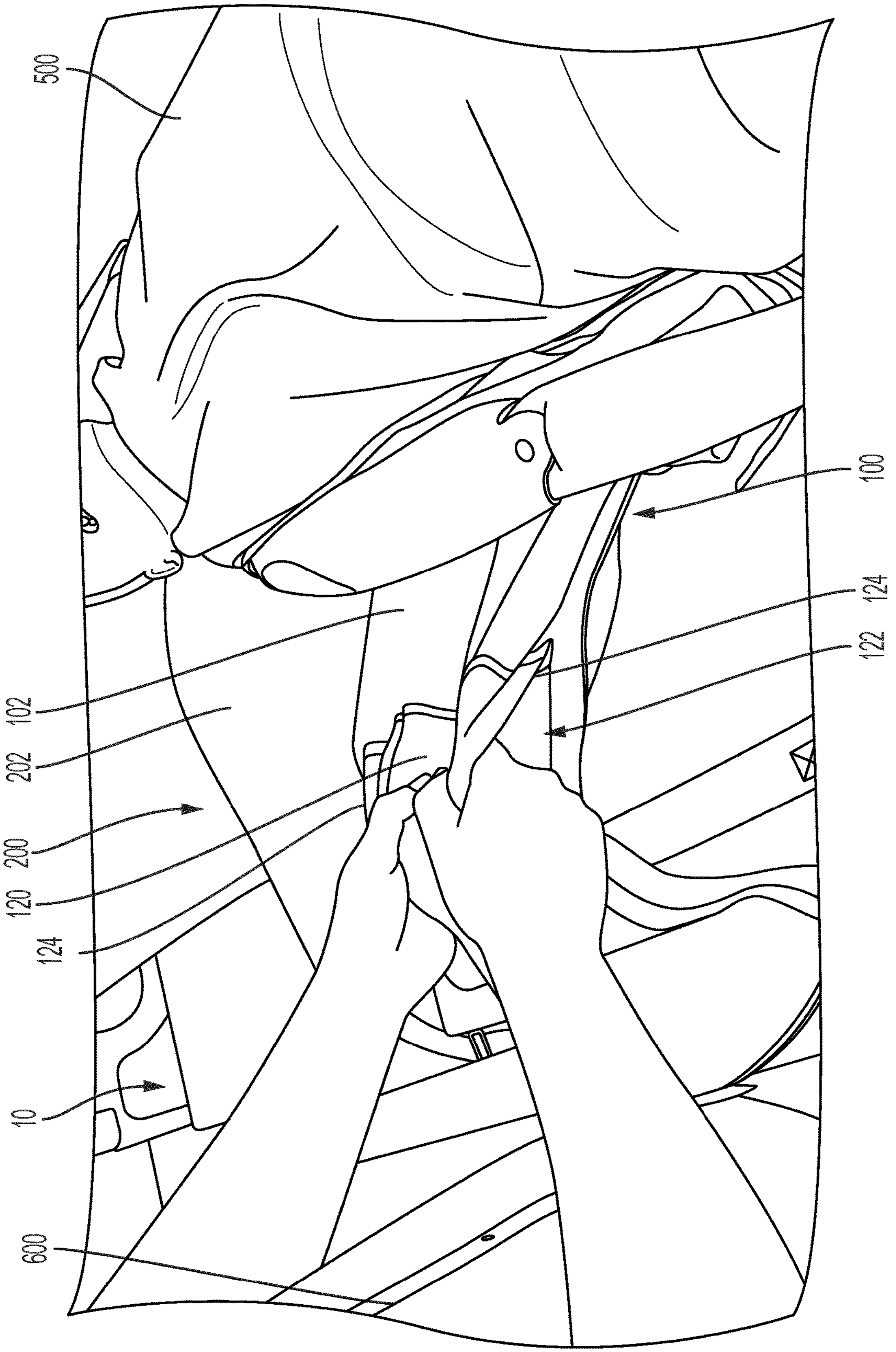
FIG. 10 is another perspective view of the sheet assembly of FIG. 8.
Figure 11:
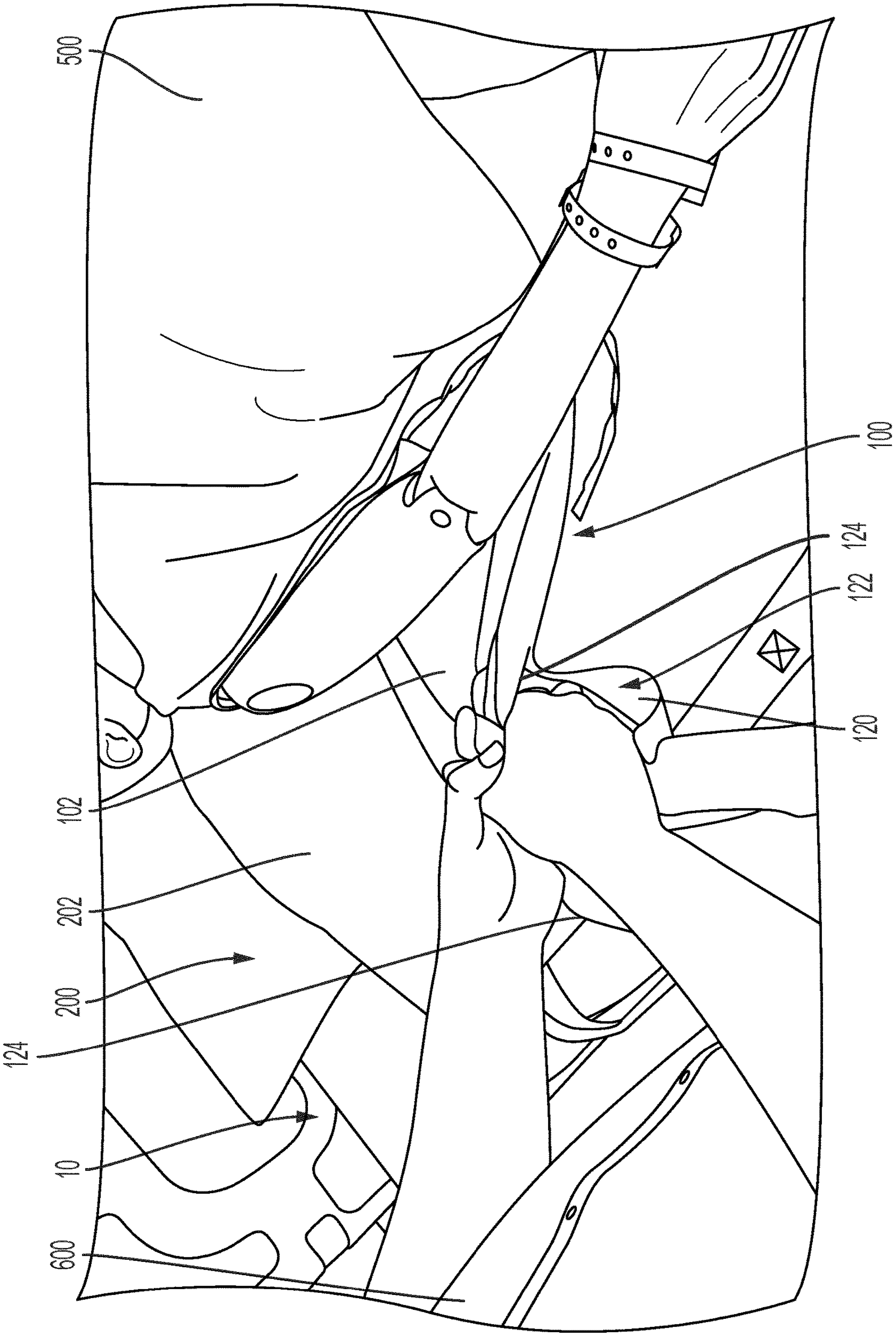
FIG. 11 is another perspective view of the sheet assembly of FIG. 8.
Figure 12:
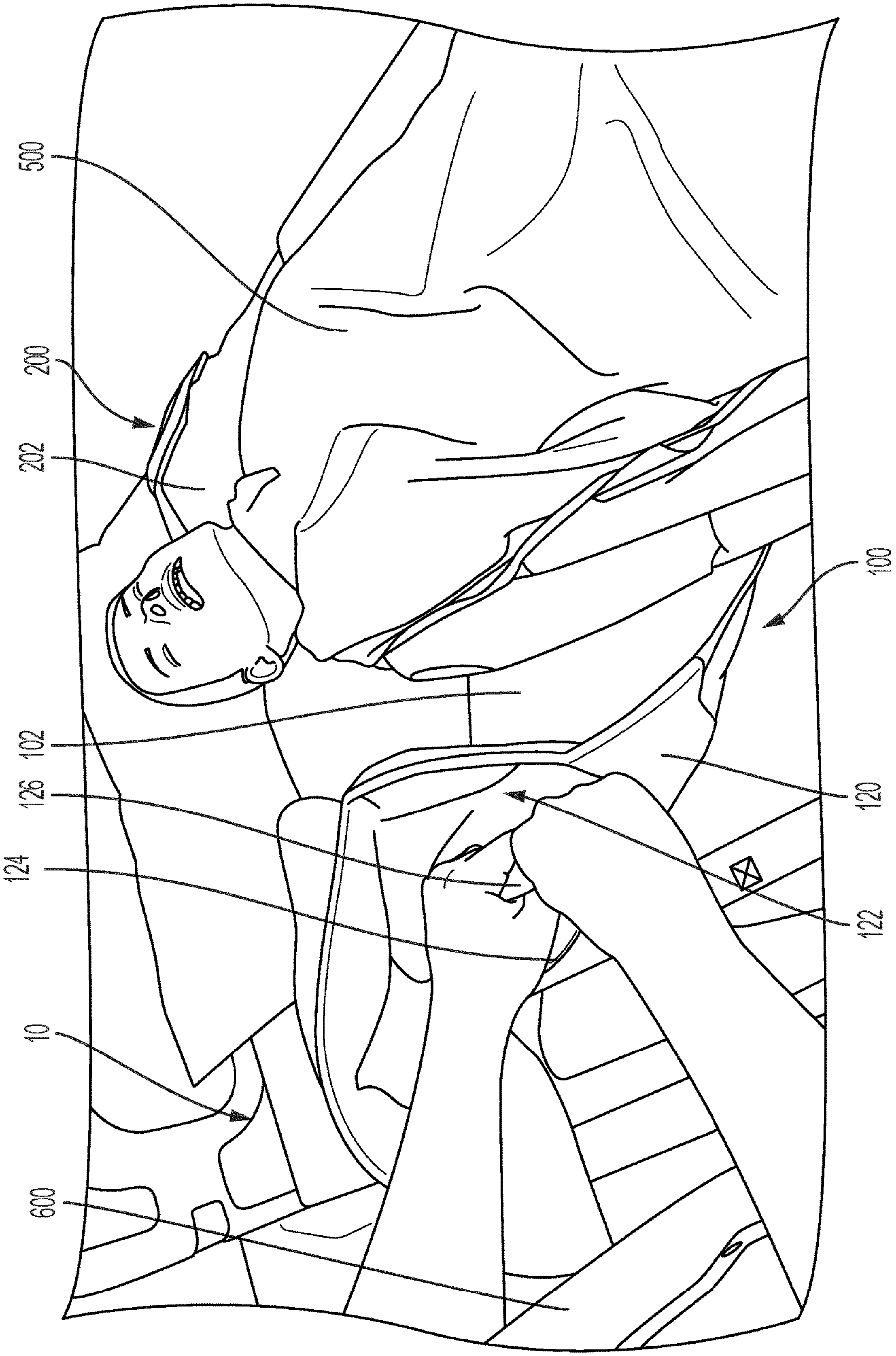
FIG. 12 is a perspective view another example sheet assembly positioned under a patient.
Figure 13:
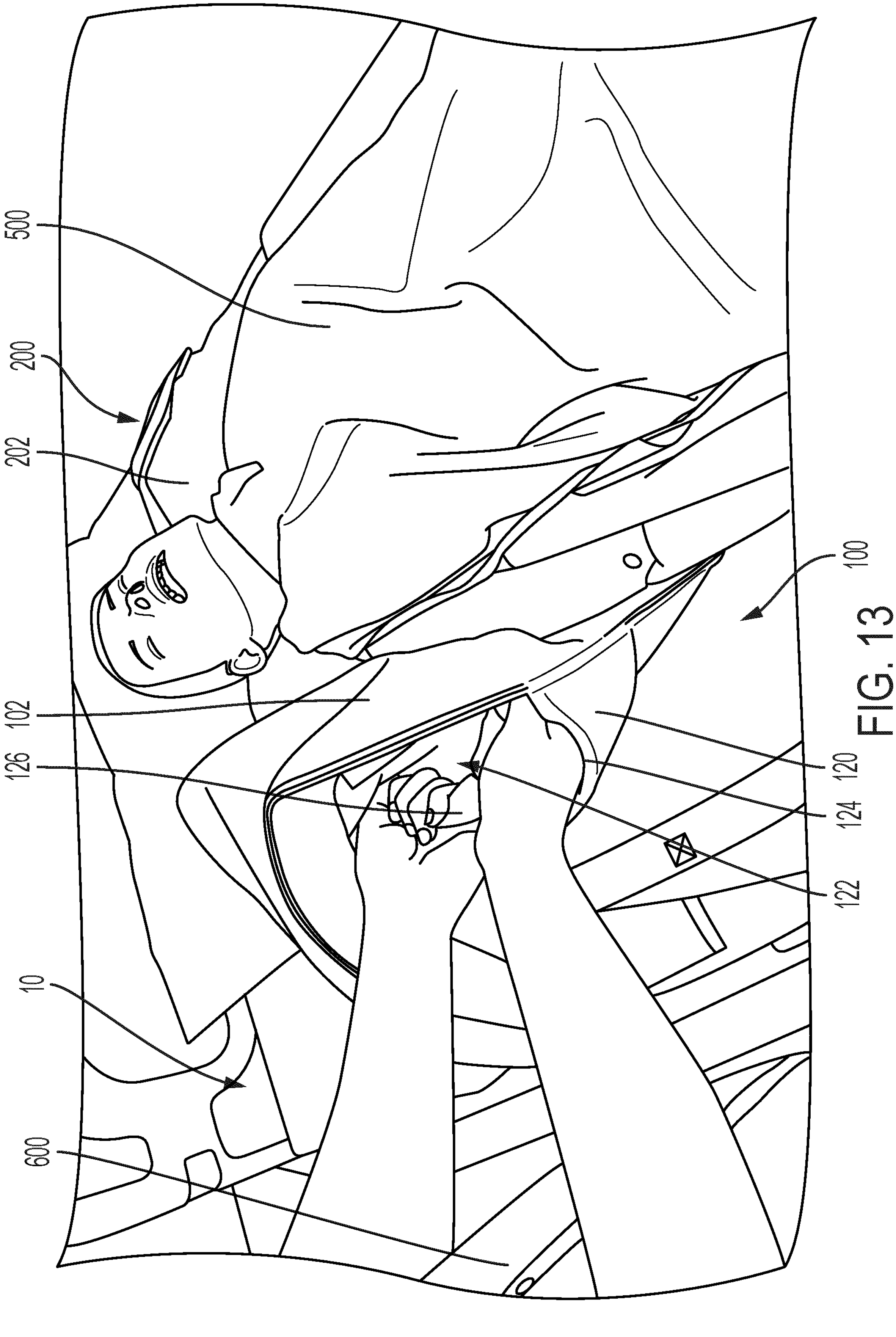
FIG. 13 is another perspective view of the sheet assembly of FIG. 12.
Figure 14:
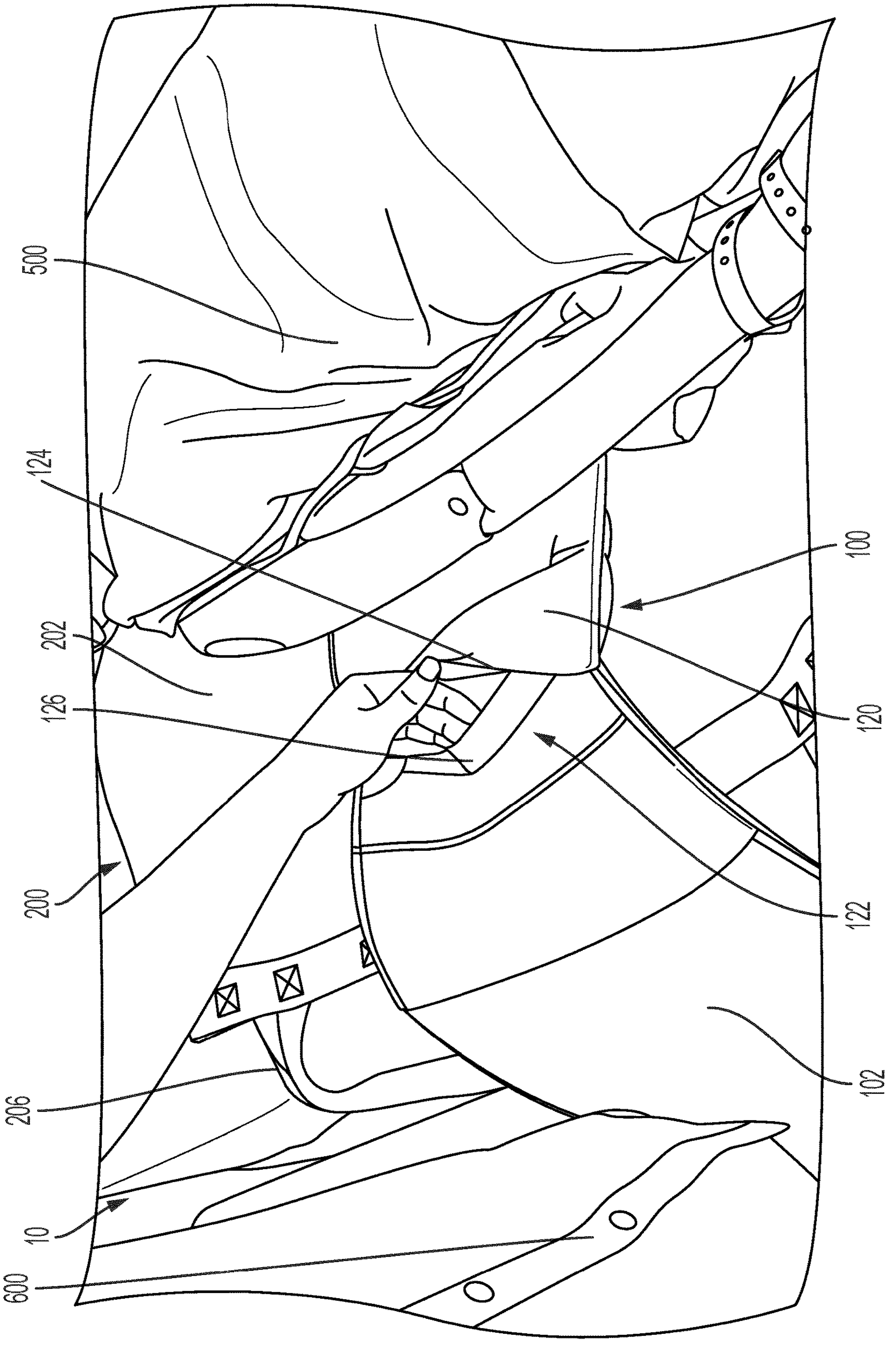
FIG. 14 is a perspective view of another example sheet assembly positioned under a patient.
Figure 15:
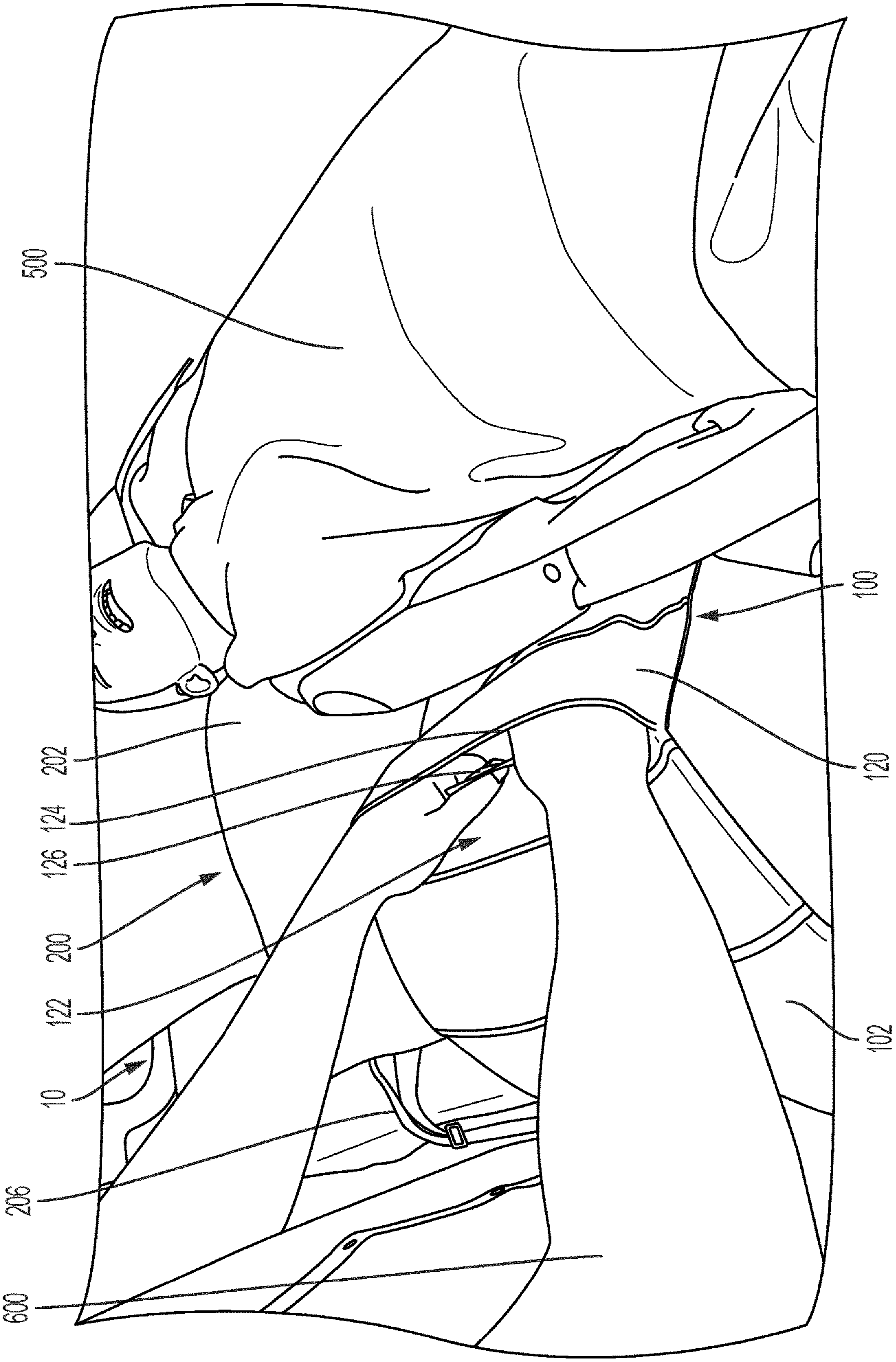
FIG. 15 is another perspective view of the sheet assembly of FIG. 14.
Figure 16:
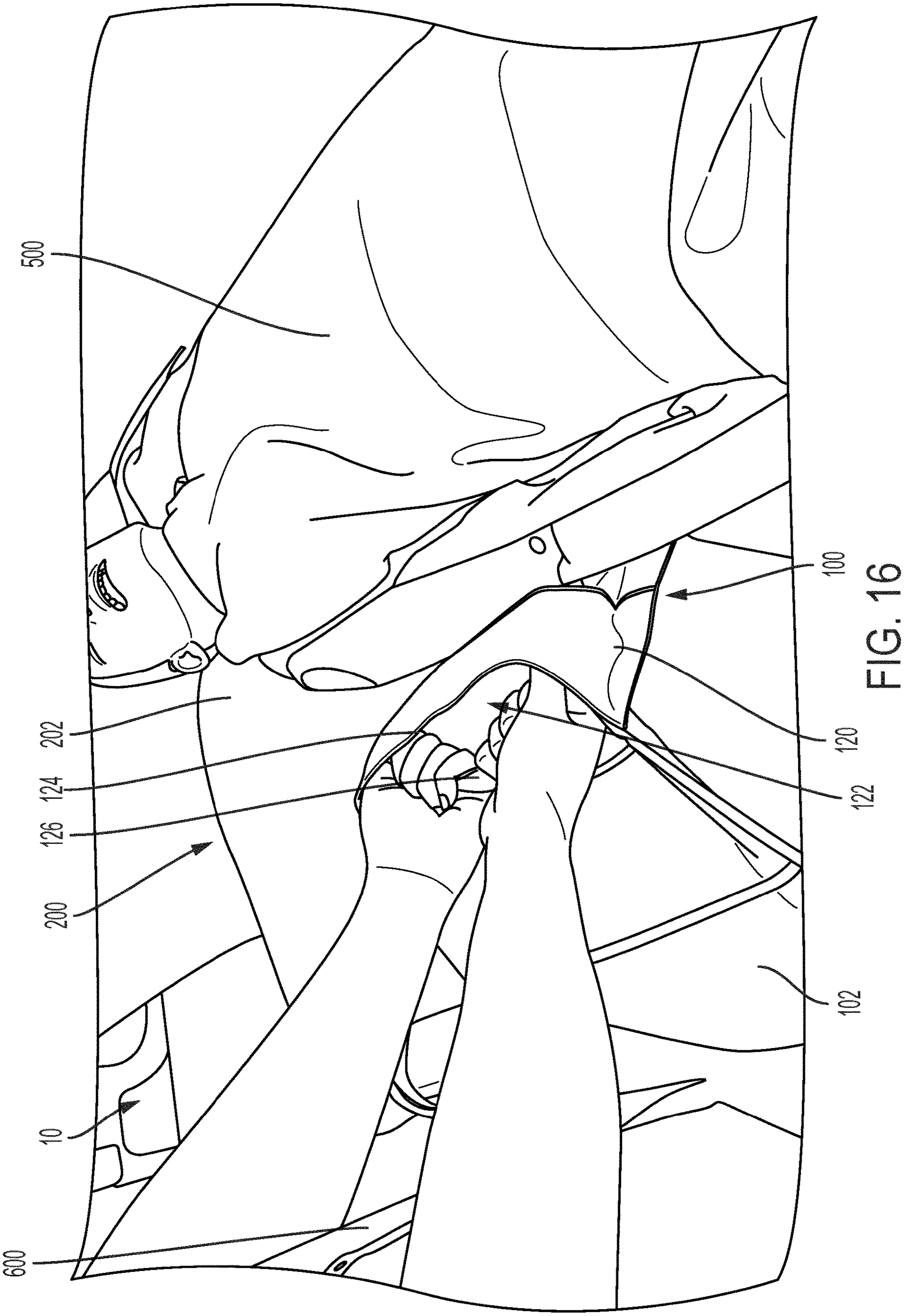
FIG. 16 is another perspective view of the sheet assembly of FIG. 14.

As shown in FIG. 7, the pocket sheet 120 of the handle interface 112 is coupled to the base sheet 102 to orient the pocket opening 124 in a direction away from the first axis 106, according to some embodiments. For example, the pocket sheet 120 and the base sheet 102 may collectively define the pocket opening 124 oriented in the direction away from the first axis 106. When the pocket opening 124 is oriented away from the first axis 106, the operator 600 may extend their hand through the pocket opening 124 into the pocket cavity 122 in a direction towards the first axis 106 to grasp the sheet assembly 100.

As shown in FIGS. 6 and 12-16, the pocket sheet 120 of the handle interface 112 is coupled to the base sheet 102 to orient the pocket opening 124 in a direction toward the first axis 106, according to some embodiments. For example, the pocket sheet 120 and the base sheet 102 may collectively define the pocket opening 124 oriented in the direction towards the first axis 106. When the pocket opening 124 is oriented toward the first axis 106, the operator 600 may extend their hand through the pocket opening 124 into the pocket cavity 122 in a direction away from the first axis 106 to grasp the sheet assembly 100.

In various embodiments, the pocket sheet 120 of the handle interface 112 is coupled to the base sheet 102 to collectively define the first of the pocket opening 124 and the second of the pocket opening 124. The pocket sheet 120 of the handle interface 112 may be coupled to the base sheet 102 to orient the first of the pocket opening 124 in the direction toward the first axis 106 and to orient the second of the pocket opening 124 in a direction away from the first axis 106. For example, the pocket sheet 120 and the base sheet 102 may collectively define the first of the pocket opening 124 oriented in the direction toward the first axis 106 and the second of the pocket opening 124 oriented in the direction away from the first axis 106. When the first of the pocket opening 124 is oriented toward the first axis 106 and the second of the pocket opening 124 is oriented away from the first axis 106, the operator may extend their hand through the first of the pocket opening 124 in the direction away from the first axis 106 and/or through the second of the pocket opening 124 in the direction toward the first axis 106 to grasp the sheet assembly 100.

As shown in FIGS. 8-11, 17, and 18, the pocket sheet 120 of the handle interface 112 is coupled to the base sheet 102 to orient the pocket opening 124 in a direction parallel to the first axis 106 of the sheet assembly 100, according to some embodiments. For example, the pocket sheet 120 and the base sheet 102 may collectively define the pocket opening 124 oriented in the direction parallel to the first axis 106 of the sheet assembly 100. When the pocket opening 124 is oriented in the direction parallel to the first axis 106, the operator 600 may extend their hand through the pocket opening 124 into the pocket cavity 122 in a direction parallel to the first axis 106 to grasp the sheet assembly 100. As another example, an axis (e.g., a third axis, a fourth axis, etc.) contiguous with an edge (e.g., a first edge, a second edge, etc.) of the pocket sheet 120 defining the pocket opening 124 may be parallel to the second axis 110 to orient the pocket opening 124 in the direction parallel to the first axis 106.

In some embodiments, the pocket sheet 120 of the handle interface 112 is coupled to the base sheet 102 to orient the pocket opening 124 in a direction away from the second axis 110. For example, the pocket sheet 120 and the base sheet 102 may collectively define the pocket opening 124 oriented in the direction away from the second axis 110. When the pocket opening 124 is oriented away from the first axis 106, the operator 600 may extend their hand through the pocket opening 124 into the pocket cavity 122 in a direction towards the second axis 110 to grasp the sheet assembly 100.

As shown in FIGS. 8-11, 17, and 18, the pocket sheet 120 of the handle interface 112 is coupled to the base sheet 102 to collectively define the first of the pocket openings 124 and the second of the pocket openings 124, according to some embodiments. The pocket sheet 120 of the handle interface 112 may be coupled to the base sheet 102 to orient the first of the pocket openings 124 in a first direction away from the second axis 110 and to orient the second of the pocket openings 124 in a second direction away from the second axis 110. For example, the pocket sheet 120 and the base sheet 102 may collectively define the first of the pocket openings 124 oriented in the first direction toward the second axis 110 and the second of the pocket openings 124 oriented in the second direction away from the second axis 110. When the first of the pocket openings 124 is oriented away from the second axis 110 in the first direction and the second of the pocket openings 124 is oriented away from the second axis in the second direction, the operator may extend their hand through the first of the pocket openings 124 and/or the second of the pocket openings 124 in a direction toward the second axis 110 to grasp the sheet assembly 100. As another example, a first axis contiguous with a first edge of the pocket sheet 120 defining the first of the pocket openings 124 may be parallel to the second axis 110 and a second axis contiguous with a second edge of the pocket sheet 120 defining the second of the pocket openings 124 may also be parallel to the second axis 110 to orient the pocket cavity 122 in the direction parallel to the first axis 106.

In other embodiments, the pocket of the handle interface 112 is coupled to the base sheet 102 to orient the pocket opening 124 in a direction at an angle (e.g., an angle other than perpendicular or parallel, etc.) relative to the first axis 106 and/or the second axis 110 (e.g., as an angled pocket opening, etc.). For example, the pocket sheet 120 and the base sheet 102 may collectively define the pocket opening 124 oriented in the direction at the angle to the first axis 106 and/or the second axis 110. When the pocket opening 124 is oriented in the direction at the angle relative to the first axis and/or the second axis 110, operator may extend their hand through the pocket opening 124 from a direction at an entrance angle perpendicular to the angled apertures to grasp the sheet assembly 100.

In some embodiments, at least one of the handle interfaces 112 defines a plurality of the pocket sheet 120 coupled to the base sheet 102 to each form the pocket cavity 122 positioned between each of the pocket sheet 120 and the base sheet 102. The pocket sheet 120 and the pocket cavity 122 may be spaced apart along at least a portion of the first axis 106. For example, a first of the pocket sheet 120 and a corresponding first of the pocket cavity 122 may be positioned proximate a first of the lengthwise edges 108 and a second of the pocket sheet 120 and a corresponding second of the pocket cavity 122 may be spaced from the first of the pocket sheet 120 along the first axis 106 such that the second of the pocket sheet 120 is positioned proximate a second of the lengthwise edges 108.

The pocket sheet 120 defined by the at least one of the handle interfaces 112 may be evenly spaced apart along the first axis 106. For example, a first of the pocket sheet 120 of the at least one of the handle interfaces 112 may be positioned two inches away from a first of the lengthwise edges 108, a second of the pocket sheet 120 of the at least one of the handle interfaces 112 may be positioned two inches away from the first of the pocket sheet 120 of the at least one of the handle interfaces 112, and a third of the pocket sheet 120 of the at least one of the handle interfaces 112 may be positioned two inches away from the second of the pocket sheet 120 of the at least one of the handle interfaces 112. In other embodiments, the plurality of the pocket sheet 120 defined by at least one of the handle interfaces 112 may be unevenly spaced apart along the first axis 106.

In some embodiments, a width of each of the pocket opening 124 in a direction parallel to the first axis 106 is equal for each of the handle interfaces 112. For example, each of the pocket sheet 120 of one of the handle interfaces 112 may be coupled to the base sheet 102 such that the widths of each of the pocket opening 124 of the one of the handle interfaces 112 are equal. In other embodiments, a width of each of the pocket opening 124 in the direction parallel to the first axis 106 are different for each of the handle interfaces 112. For example, a first width of a first of the pocket opening 124 collectively defined by a first of the pocket sheet 120 and the base sheet 102 may be configured to fit a hand of the operators 600 with a small sized hand, a second width of a second of the pocket opening 124 collectively defined by a second of the pocket sheet 120 and the base sheet 102 may be wider than the first width of the first of the pocket opening 124 and may be configured to fit a hand of the operators 600 with a medium sized hand, and a third width of a third of the pocket opening 124 collectively defined by a third of the pocket sheet 120 and the base sheet 102 may be wider than the second width of the second of the pocket opening 124 and may be configured to fit a hand of the operators 600 with a large sized hand.

In still other embodiments, the width of each of the pocket opening 124 in the direction parallel to the first axis 106 are different for each of the handle interfaces 112. For example, a first width of the pocket opening 124 of a first of the handle interfaces 112 may be configured to fit a hand of the operators 600 with a small sized hand, a second width of the pocket opening 124 of a second of the handle interfaces 112 may be wider than the first width of the pocket opening 124 of the first of the handle interfaces 112 and may be configured to fit a hand of the operators 600 with a medium sized hand, and a third width of the pocket opening 124 of a third of the handle interfaces 112 may be wider than the second width of the pocket opening 124 of the second of the handle interfaces 112 and may be configured to fit a hand of the operators 600 with a large sized hand.

As shown in FIGS. 12-18, each of the handle interfaces 112 includes a handle strap 126 (e.g., a first handle strap, a second handle strap, etc.) positioned within the pocket cavity 122 and configured to be grasped by the hand of the operator 600, according to some embodiments. In some embodiments, each of the handle interfaces 112 includes a plurality of the handle straps 126 positioned within the pocket cavity 122 and configured to be grasped by the hand of the operator 600. Each of the handle straps 126 includes a coupling portion (e.g., a fixed portion, etc.) coupled to the pocket sheet 120 and/or the base sheet 102 and a non-coupling portion (e.g., a free portion, etc.) that may be separated slightly from the pocket sheet 120 and/or the base sheet 102 to allow the operator 600 to grasp the non-coupling portion of the handle strap 126. In some embodiments, each of the ends of the handle straps 126 are coupled to the pocket sheet 120 and/or the base sheet 102 and are the coupling portion of the handle straps 126 and an intermediate portion of the handle straps 126 between the ends of the handle straps 126 is the non-coupling portion. In various embodiments, the handle straps 126 include a plurality of the coupling portions spaced apart along a length of the handle straps 126 and at least one of the non-coupling portions between at least two of the coupling portions.

As shown in FIGS. 12-18, the handle strap 126 is positioned proximate the pocket opening 124, according to some embodiments. For example, the coupling portions of the handle strap 126 may be coupled to the pocket sheet 120 and/or the base sheet 102 proximate the portions of the pocket sheet 120 and the base sheet 102 that collectively define the pocket opening 124. In other embodiments, the handle strap 126 is not positioned proximate the pocket opening 124. For example, the handle strap 126 may be positioned at an opposite end of the pocket cavity 122 from the pocket opening 124 (e.g., at a back of the pocket cavity 122, etc.).

Figure 17:
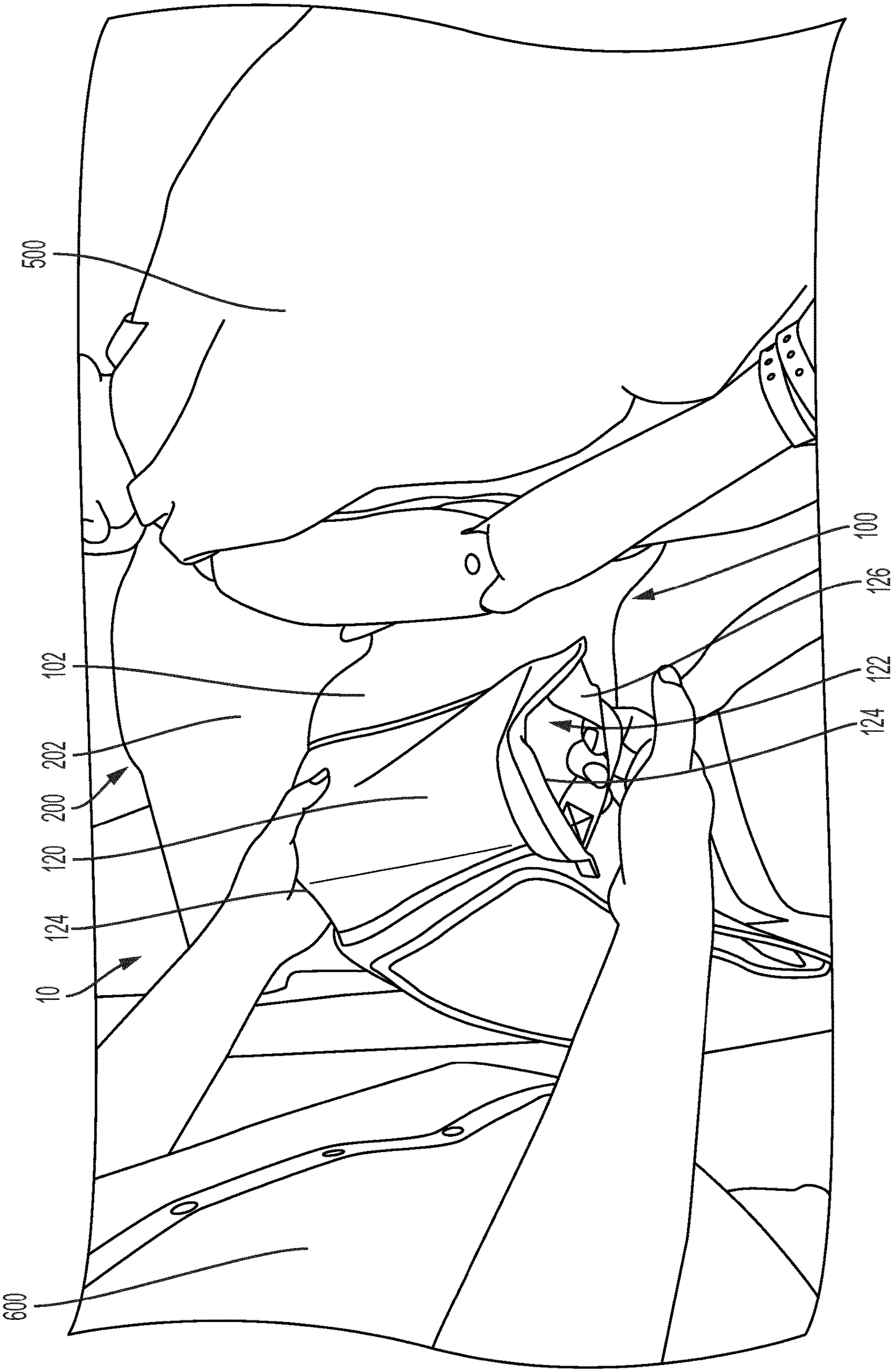
FIG. 17 is a perspective view of another example sheet assembly positioned under a patient.
Figure 18:
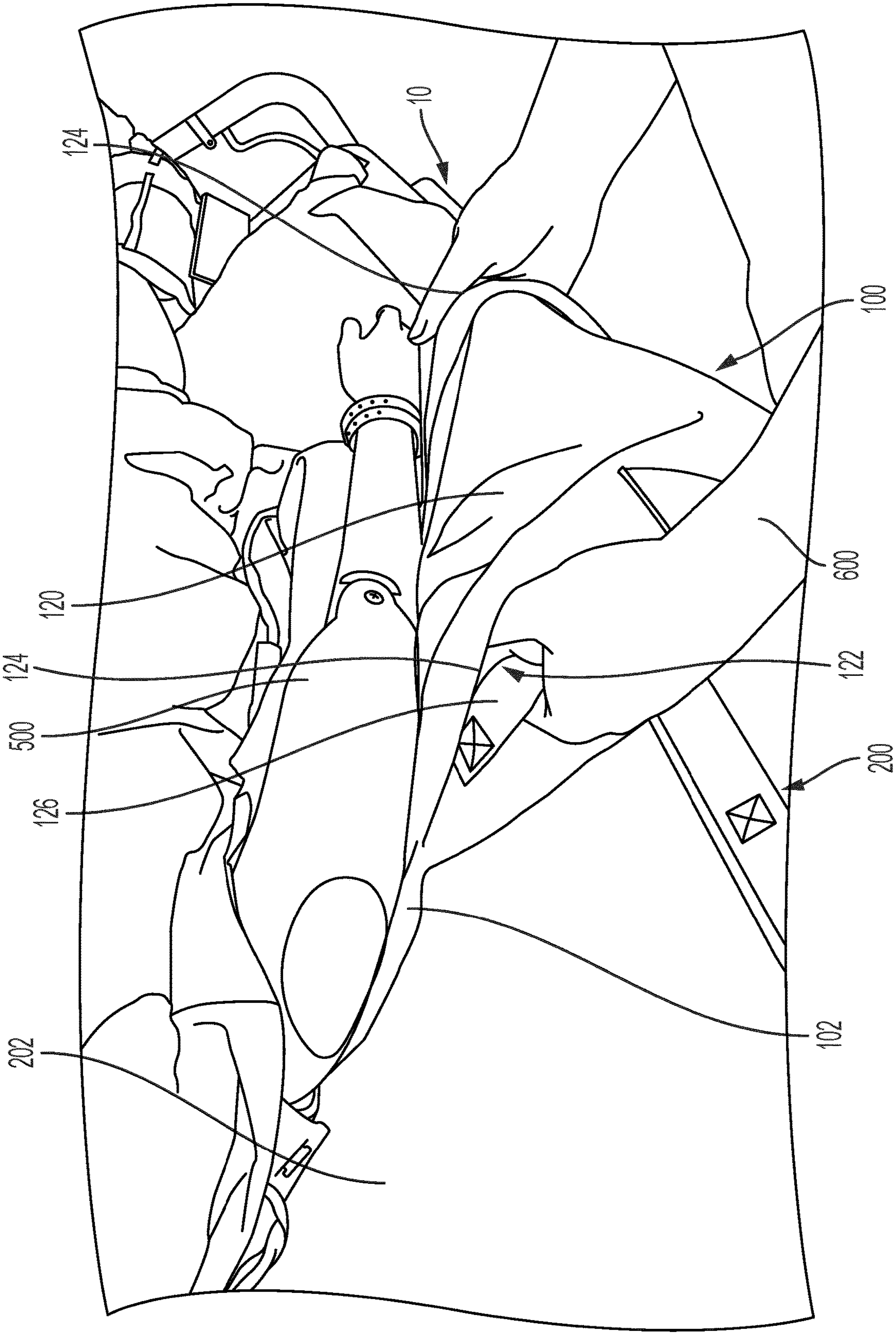
FIG. 18 is a perspective view of another example sheet assembly positioned under a patient.

As shown in FIGS. 17 and 18, the handle interface 112 includes one of the handle straps 126 positioned proximate each of the pocket opening 124 of the handle interface 112, according to some embodiments. For example, if the handle interface 112 includes two of the pocket opening 124, then the handle interface 112 may also include a first of the handle straps 126 coupled to the pocket sheet 120 and/or the base sheet 102 proximate a first of the pocket opening 124 and a second of the handle straps 126 coupled to the pocket and/or the base sheet 102 proximate a second of the pocket opening 124.

As shown in FIGS. 12-16, the handle strap 126 is oriented parallel to the first axis 106, according to some embodiments. In some embodiments, the handle strap 126 is oriented parallel to the first axis 106 when at least one of the pocket opening 124 of the handle interfaces 112 that includes the handle strap 126 is oriented in the direction parallel to the second axis 110 such that the operator may extend their hand into the pocket cavity 122 of the handle interfaces 112 in the direction parallel to the second axis 110 and grasp the handle strap 126 perpendicular to the second axis 110.

As shown in FIGS. 17 and 18, the handle strap 126 is oriented parallel to the second axis 110, according to some embodiments. In some embodiments, the handle strap 126 is oriented parallel to the second axis 110 when at least one of the pocket opening 124 of the handle interfaces 112 that includes the handle strap 126 is oriented in the direction parallel to the first axis 106 such that the operator may extend their hand into the pocket cavity 122 of the handle interfaces 112 in the direction parallel to the first axis 106 and grasp the handle strap 126 perpendicular to the first axis 106.

As shown in FIG. 17, the handle strap 126 is configured to be able to extend outside of the pocket cavity 122 when grasped by the operator 600. For example, a length of at least one of the non-coupling portions of the handle strap 126 may be sufficient to allow for a portion of the at least one of the non-coupling portions of the handle strap 126 to extend outside of the pocket cavity 122 when the operator 600 grasps the at least one of the non-coupling portions of the handle strap 126 and pulls it toward the pocket opening 124 proximate the at least one of the non-coupling portions of the handle strap 126. In other embodiments, the handle strap 126 is not configured to be able to extend outside of the pocket cavity 122.

In some embodiments, a length of each of the non-coupling portions of at least one of the handle straps 126 is equal. For example, one of the handle straps 126 may include three of the coupling portions and two of the non-coupling portions. A first of the non-coupling portions may be positioned between a first of the coupling portions and a second of the coupling portions and a second of the non-coupling portions may be positioned between the second of the coupling portions and a third of the coupling portions. A first length of the first of the non-coupling portions may be equal to a second length of the second of the non-coupling portions. In other embodiments, the length of each of each of the non-coupling portions of at least one of the handle straps 126 are different. In still other embodiments, the length of each of the non-coupling portions of the handle straps 126 are different for each of the handle interface 112.

As shown in FIG. 19, the sheet assembly 100 may be folded (e.g., wrapped, swaddled, etc.) over an arm of the patient 500 by the operator 600 to constrain the arm of the patient 500, according to some embodiments. In some embodiments, a foldable portion of the sheet assembly 100 configured to be folded over the arm of the patient 500 includes at least one of the handle interfaces 112. In other embodiments, the foldable portion of the sheet assembly 100 does not include the handle interfaces 112.

Figure 20:
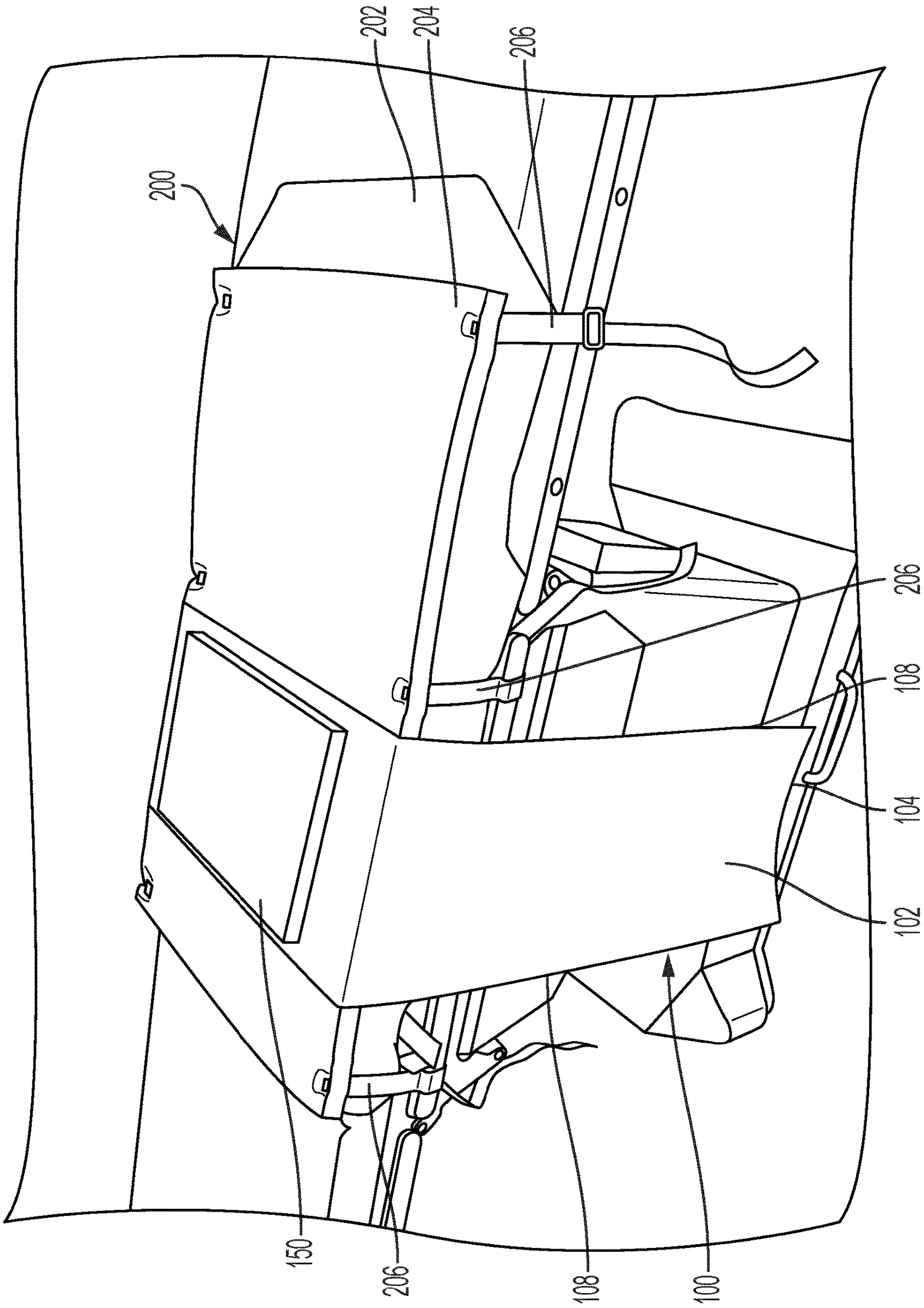
FIG. 20 is a perspective view of another example sheet assembly positioned on a bed.
Figure 21:
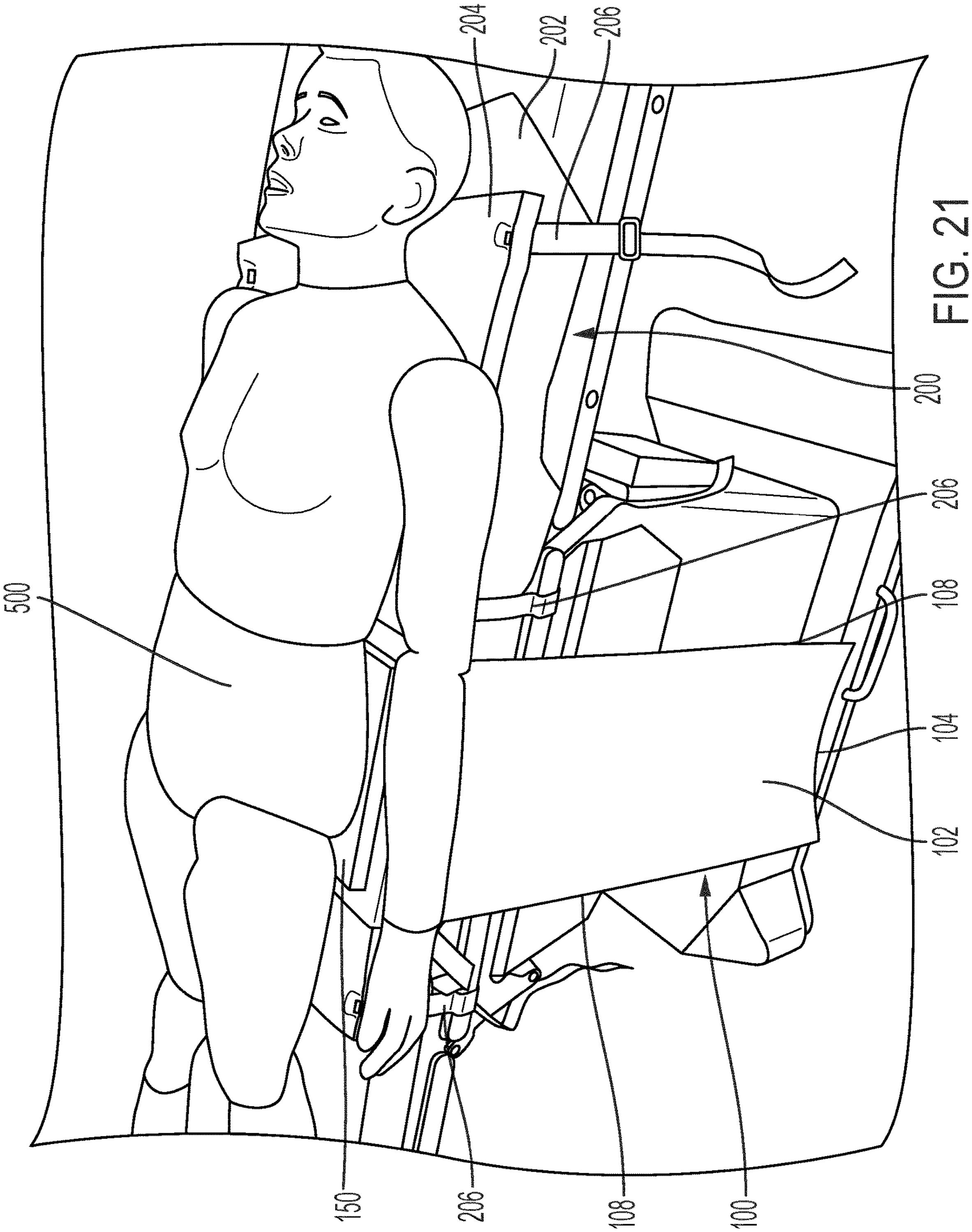
FIG. 21 is another perspective view of the sheet assembly of FIG. 20 positioned under a patient.

As shown in FIGS. 20 and 21, the sheet assembly 100 includes a pad 150 (e.g., cushion, etc.) coupled to the top surface of the base sheet 102. The pad 150 may be configured to be positioned between the patient 500 and the base sheet 102 to increase a comfort of the patient 500, according to some embodiments. For example, the pad 150 may reduce a pressure applied by the sheet assembly 100 on the patient 500 when the patient 500 is positioned using the sheet assembly 100. In operation, the operator 600 may position the patient 500 on the pad 150 of the sheet assembly 100 prior to moving the patient 500 with the sheet assembly 100. In other embodiments, the pad 150 is coupled to the bottom surface of the base sheet 102 and the pad 150 may be configured to be positioned between the base sheet 102 and a surface that the patient 500 is resting on.

The pad 150 may be formed out of material that conforms to a shape of a portion of the patient 500 that comes into contact with the pad 150 such as a memory foam, a gel foam, an air cushion, or other flexible materials. The pad 150, or a portion thereof, may be configured to have a high coefficient of friction (e.g., formed out of a material with a high coefficient of friction, coated with a material with a high coefficient of friction, etc.) to reduce the possibility of the patient 500 slipping off of the pad 150 when the patient 500 is positioned on the pad 150. For example, the pad 150, or a portion thereof, may be coated with a rubber coating to increase the coefficient of friction of the pad 150. In some embodiments, the pad 150 is formed and/or coated with materials that are easy to clean (e.g., materials that are compatible with cleaning products, materials that may be run through a laundry machine, etc.), materials that have antiseptic properties (e.g., materials that kill pathogens on contact, materials that are not conducing to hosting pathogens, etc.), and/or materials with a high durability (e.g., materials that may retain desired properties through multiple uses, etc.). In some embodiments, the pad 150 is formed out of the same material and/or coated with the same coating as the base sheet 102 and/or the pocket sheet 120. In other embodiments, the pad 150 is formed out of a different material and/or coated with a different coating as the base sheet 102 and/or the pocket sheet 120.

In some embodiments, the pad 150 is substantially centered on the first axis 106 and/or the second axis 110. The pad 150 may be positioned between the first of the handle interfaces 112 proximate the first of the crosswise edges 104 and the second of the handle interface 112 proximate the second of the crosswise edges 104. The pad 150 may be positioned between the first of the lengthwise edges 108 and the second of the lengthwise edges 108. In some embodiments, a pad footprint of the pad 150 is less than a sheet footprint of the base sheet 102. For example, when the pad footprint of the pad 150 is less than the sheet footprint of the base sheet 102 and the pad footprint of the pad 150 is positioned inside of the sheet footprint of the base sheet 102, the base sheet 102 may separate the pad 150 from an external surface (e.g., a bed, an operating table, etc.) when the sheet assembly 100 is positioned on the external surface (e.g., rests on the surface, etc.) such that the pad 150 does not contact the surface. In other embodiments, the pad footprint of the pad 150 extends outside of the sheet footprint of the base sheet 102.

The pad 150 may provide structural stability to the base sheet 102 to resist the bunching of the base sheet 102, according to some embodiments. The pad 150 may resist the bunching of the base sheet along the first axis 106 and/or the second axis 110. For example, when the operator 600 grasps the draw sheet assembly 100 to reposition the patient 500, a portion of the base sheet 102 proximate the hand of the operator 600 may bunch up due to the grasp of the operator 600 (e.g., a surface area of the base sheet 102 proximate the hand of the operator 600 may be reduced, etc.). However, the pad 150 resists the bunching proximate the pad 150, resulting in minimal reduction of a contact surface between the patient 500 and the pad 150 (e.g., a surface area of the pad 150 is minimally reduced, etc.). By preventing some reduction of the contact surface between the patient 500 and the pad 150, the pad 150 may reduce a risk of pressure injuries and/or skin breakdowns on the patient 500. The pad 150 may also reduce a risk of slippage of the draw sheet assembly 100 from under the patient 500 by preventing some reduction of the contact surface between the patient 500 and the pad 150.

The cushion may also provide additional structural stability to the draw sheet and reducing the likelihood of the draw sheet bunching under the patient. As a result, the cushion may limit the risk of pressure injuries and/or skin breakdowns of the patient due to the draw sheet bunching under the patient and reduce the risk of the draw sheet slipping out from under the patient when the caregiver attempts to reposition the patient.

As shown in FIGS. 3-21, the sheet assembly 100 may be configured to be positioned between the patient 500 and a bed 10 (e.g., a hospital bed, a surface, an operating bed, etc.) in order to move or reposition the patent on the bed 10, according to some embodiments. In some embodiments, the sheet assembly 100 is also configured to remove the patient 500 from the bed 10 to another surface (e.g., another of the bed 10, an operating table, etc.) and/or move the patient 500 from another surface to the bed 10.

As shown in FIGS. 20 and 21, the sheet assembly 100 may also be configured to be positioned between the patient 500 and a bed support 200 (e.g., an extra support, a bed cover, etc.) positioned on the bed 10, according to some embodiments. The bed support 200 may include a support sheet 202 configured to cover at least a portion of the bed 10 and separate the patient 500 from the bed 10. The bed support 200 may also include a support pad 204 configured to be positioned between the bed 10 and the patient 500 and increase the comfort of the patient 500. The bed support 200 may also include support straps 206 configured to secure the bed support 200 to the bed 10 such that the bed support 200 does not move with the sheet assembly 100 when the operator 600 moves and/or repositions the patient 500 using the sheet assembly 100. In various embodiments, the sheet assembly 100 may be configured to be positioned on the bed 10, the support sheet 202, and/or the support pad 204.

III. Configuration of Example Embodiments

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, exhaust gas, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W to P, etc.) herein are inclusive of their maximum values and minimum values (e.g., W to P includes W and includes P, etc.), unless otherwise indicated. Furthermore, a range of values (e.g., W to P, etc.) does not necessarily require the inclusion of intermediate values within the range of values (e.g., W to P can include only W and P, etc.), unless otherwise indicated.

It is important to note that the construction and arrangement of the sheet assembly 100, and components thereof as shown in the various exemplary embodiments is illustrative only. Additionally, any element disclosed in one embodiment may be incorporated or utilized with any other embodiment disclosed herein.

The invention claimed is:

1. A sheet assembly for positioning a patient, the sheet assembly comprising:

a base sheet defining a first axis extending in a direction parallel to a width of the base sheet and a second axis extending in a direction parallel to a length of the base sheet, the base sheet having a first end on a first side of the first axis and a second end on an opposing second side of the first axis;

a first handle interface positioned on the first end, the first handle interface defining a first opening configured to receive a hand of an operator of the sheet assembly the first handle interface comprising:

a first pocket sheet coupled to a surface of the base sheet, the first pocket sheet and the base sheet cooperatively defining (i) a first pocket cavity between the first pocket sheet and the base sheet and (ii) a first opening configured to allow access into the first pocket cavity and to receive a hand of an operator of the sheet assembly, and a first handle strap coupled to at least one of the base sheet or the first pocket sheet, the first handle strap positioned in the first pocket cavity, the first handle strap configured to be grasped by the hand; and a second handle interface positioned on the second end, the second handle interface defining a second opening configured to receive the hand the second handle interface comprising:

a second pocket sheet coupled to the surface of the base sheet, the second pocket sheet and the base sheet cooperatively defining (i) a second pocket cavity between the second pocket sheet and the base sheet and (ii) a second opening configured to allow access into the second pocket cavity and to receive the hand, and a second handle strap coupled to at least one of the base sheet or the second pocket sheet, the second handle strap positioned in the second pocket cavity, the second handle strap configured to be grasped by the hand.

2. The sheet assembly of claim 1, wherein:

the first opening is formed as a first slit in the base sheet;

the second opening is formed as a second slit in the base sheet; and the first opening and the second opening are oriented parallel to the first axis.

3. The sheet assembly of claim 1, wherein:

the first opening is formed as a first slit in the base sheet;

the second opening is formed as a second slit in the base sheet; and the first opening and the second opening are oriented parallel to the second axis.

4. The sheet assembly of claim 1, further comprising:

a third handle interface positioned on the first end, the third handle interface defining a third opening configured to receive the hand; and a fourth handle interface positioned on the second end, the fourth handle interface defining a fourth opening configured to receive the hand;

wherein the first handle interface and the third handle interface are spaced apart along a first portion of the second axis; and wherein the second handle interface and the fourth handle interface are spaced apart along a second portion of the second axis.

5. The sheet assembly of claim 4, wherein:

a first length of the first opening in the direction parallel to the second axis and a second length of the second opening in the direction parallel to the second axis are equal;

a third length of the third opening in the direction parallel to the second axis and a fourth length of the fourth opening in the direction parallel to the second axis are equal; and the first length and the third length are not equal.

6. The sheet assembly of claim 4, wherein:

a first width of the first opening in the direction parallel to the first axis and a second width of the second opening in the direction parallel to the first axis are equal;

a third width of the third opening in the direction parallel to the first axis and a fourth width of the fourth opening in the direction parallel to the first axis are equal; and the first width and the third width are not equal.

7. The sheet assembly of claim 1, wherein:

the first handle interface further defines a third opening positioned parallel to the first opening in the direction parallel to the first axis, the third opening configured to receive the hand;

the second handle interface further defines a fourth opening positioned parallel to the second opening, the fourth opening configured to receive the hand;

a first length of the first opening in the direction parallel to the second axis and a second length of the second opening in the direction parallel to the second axis are equal;

a third length of the third opening in the direction parallel to the second axis and a fourth length of the fourth opening in the direction parallel to the second axis are equal; and the first length and the third length are not equal.

8. The sheet assembly of claim 1, wherein:

a third axis contiguous with a first edge of the first pocket sheet defining the first opening is parallel to the first axis; and a fourth axis contiguous with a second edge of the second pocket sheet defining the second opening is parallel to the first axis.

9. The sheet assembly of claim 1, wherein:

the first handle strap comprises a first coupling portion coupled to at least one of the base sheet or the first pocket sheet and a first non-coupling portion extending from the first coupling portion in the direction parallel to the first axis; and the second handle strap comprises a second coupling portion coupled to at least one of the base sheet or the second pocket sheet and a second non-coupling portion extending from the second coupling portion in the direction parallel to the first axis.

10. The sheet assembly of claim 1, wherein:

the first pocket sheet and the base sheet further cooperatively define a third opening configured to allow access into the first pocket cavity;

the second pocket sheet and the base sheet further cooperatively define a fourth opening configured to allow access into the second pocket cavity;

a third axis contiguous with a first edge of the first pocket sheet defining the first opening is parallel to the second axis;

a fourth axis contiguous with a second edge of the first pocket sheet defining the third opening is parallel to the second axis;

a fifth axis contiguous with a third edge of the second pocket sheet defining the second opening is parallel to the second axis; and a sixth axis contiguous with a fourth edge of the second pocket sheet defining the fourth opening is parallel to the second axis.

11. The sheet assembly of claim 10, wherein:

the first handle interface further comprises:

a first handle strap coupled to at least one of the base sheet or the first pocket sheet proximate the first opening, the first handle strap positioned in the first pocket cavity, the first handle strap configured to be grasped by the hand, and a second third handle strap coupled to at least one of the base sheet or the first pocket sheet proximate the third opening, the second handle strap positioned in the first pocket cavity, the first handle strap configured to be grasped by the hand; and the second handle interface further comprises:

a third handle strap coupled to at least one of the base sheet or the second pocket sheet proximate the second opening, the third handle strap positioned in the second pocket cavity, the third handle strap configured to be grasped by the hand, and a fourth handle strap coupled to at least one of the base sheet or the second pocket sheet proximate the fourth opening, the fourth handle strap positioned in the second pocket cavity, the fourth handle strap configured to be grasped by the hand.

12. The sheet assembly of claim 1 further comprising:

a pad coupled to a surface of the base sheet, the pad being positioned between the first handle interface and the second handle interface.

13. A sheet assembly for positioning a patient, the sheet assembly comprising:

a base sheet defining a first axis extending in a direction parallel to a width of the base sheet and a second axis extending in a direction parallel to a length of the base sheet; and a handle interface positioned on the base sheet, the handle interface comprising:

a pocket sheet coupled to a surface of the base sheet, the pocket sheet and the base sheet cooperatively defining (i) a pocket cavity between the pocket sheet and the base sheet and (ii) a first opening configured to allow access into the pocket cavity, the first opening configured to receive a hand of an operator of the sheet assembly, and a handle strap coupled to at least one of the base sheet or the pocket sheet, the handle strap positioned in the pocket cavity, the handle strap configured to be grasped by the hand.

14. The sheet assembly of claim 13, wherein a third axis contiguous with a first edge of the pocket sheet defining the first opening is parallel to the first axis.

15. The sheet assembly of claim 13, wherein:

the pocket sheet and the base sheet further cooperatively define a second opening configured to allow access into the pocket cavity;

a third axis contiguous with a first edge of the pocket sheet defining the first opening is parallel to the second axis; and a fourth axis contiguous with a second edge of the pocket sheet defining the second opening is parallel to the second axis.

16. The sheet assembly of claim 15, wherein:

the handle strap is a first handle strap coupled to the at least one of the base sheet or the pocket sheet proximate the first opening;

the handle interface further comprises a second handle strap coupled to at least one of the base sheet or the pocket sheet proximate the second opening, the second handle strap positioned in the pocket cavity, the second handle strap configured to be grasped by the hand; and each of the first handle strap and the second handle strap comprise a coupling portion coupled to at least one of the base sheet or the pocket sheet and a non-coupling portion extending from the coupling portion in the direction parallel to the second axis.

17. The sheet assembly of claim 13 further comprising a pad coupled to the surface of the base sheet, wherein the base sheet separates the pad from an external surface when the sheet assembly is positioned on the surface such that the pad does not contact the external surface.

* * * * *